(12) United States Patent
Bhattacharjee et al.

(10) Patent No.: US 8,977,610 B2
(45) Date of Patent: Mar. 10, 2015

(54) AUTOMATIC DETECTION OF PATTERNS AND INFERENCE IN A DATASET

(71) Applicant: SAP AG, Walldorf (DE)

(72) Inventors: Arindam Bhattacharjee, Bangalore (IN); Ganesh Vaitheeswaran, Bangalore (IN); Prasanna Bhat Mavinakuli, Sagar Tq. (IN)

(73) Assignee: SAP SE, Walldorf (DE)

( * ) Notice: Subject to any disclaimer, the term of this patent is extended or adjusted under 35 U.S.C. 154(b) by 280 days.

(21) Appl. No.: 13/692,713

(22) Filed: Dec. 3, 2012

(65) Prior Publication Data

US 2014/0156649 A1 Jun. 5, 2014

(51) Int. Cl.
*G06F 17/30* (2006.01)

(52) U.S. Cl.
CPC .................. *G06F 17/3053* (2013.01)
USPC .......................... 707/723; 707/781

(58) Field of Classification Search
CPC ................................ G06F 17/30286
USPC .................................. 707/723, 781
See application file for complete search history.

(56) References Cited

U.S. PATENT DOCUMENTS

| | | | |
|---|---|---|---|
| 7,814,111 B2 * | 10/2010 | Levin | 707/756 |
| 8,290,882 B2 * | 10/2012 | Sharp | 706/10 |
| 2013/0117318 A1 * | 5/2013 | Paul et al. | 707/792 |

OTHER PUBLICATIONS

John Appleby, Internet article entitled "Update III: The SAP HANA FAQ—answering key SAP In-Memory questions," May 28, 2012, Business Intelligence, Business Objects, HANA, In-Memory SAP NetWeaver Platform, Consumer Business. Retrieved from: http//www.bluefinsolutions.com/insights/blog/the_sap_hana_faq_answering_key_sap_in_memory_questions/.

The Global Information Technology Report 2012, Chapter 1.7, "Harnassing the Power of Big Data in Real Time through In-Memory Technology and Analytics," SAP AG, pp. 89-96. 2012 World Economic Forum.

Jean-Pierre Ducks, "Oracle: Big Data for the Enterprise," An Oracle White Paper, Jan. 2012.

Dan Woods, "Understanding the Value of In-Memory Technology: A Comparative Approach," Forbes article dated Feb. 28, 2012.

* cited by examiner

*Primary Examiner* — Cheryl Lewis

(74) *Attorney, Agent, or Firm* — Fountainhead Law Group P.C.

(57) ABSTRACT

Techniques allow automatic identification of statistically significant attribute combinations in a dataset, and provide users with an understanding thereof including starting points for further analysis. Statistically significant combinations may be obtained from large data sets by limiting combinations to four or fewer attributes. The combinations obtained may be ranked to differentiate patterns, e.g. according to factors such as error ratio, decision tree depth, occurrences, and number of attributes. Still further insights may be achieved by ranking attributes according to the number of statistically significant combinations in which they appear. For useful visualization of statistically significant information within the patterns, only those having at least one measure/numeric may analyzed for further insight (e.g. by an outlier algorithm) and presented as output in a chart (e.g. pie, bar) form. The decision tree approach of various embodiments may facilitate 'What if' analysis of the data, as well as obtaining the reverse inference.

15 Claims, 54 Drawing Sheets

| Store_Sale | Store_ | Unit | product | brand-n | Custom | Custom | Custom | Custom | Yearly | membe | Custo | Custom |
|---|---|---|---|---|---|---|---|---|---|---|---|---|
| 4.86 | 1.7 | 3 | CDR App | CDR | Burke | Mahtou | Woodb | USA | USD50 | Bronze | Mana | Bachel |
| 4.86 | 1.8 | 3 | CDR App | CDR | Tibbs | Richard | Olymbia | USA | USD90 | Bronze | Mana | Partial |
| 3.24 | 1.17 | 2 | CDR App | CDR | Bagley | Mary El | Torranc | USA | USD10 | Normal | Skille | Partial |
| 3.24 | 1.2 | 2 | CDR App | CDR | Weiber | John | Berkele | USA | USD50 | Bronze | Profe | Bachel |
| 4.86 | 1.7 | 3 | CDR App | CDR | Jones | Rafael | Port Or | USA | USD10 | Golden | Cleri | Partial |
| 3.24 | 1.13 | 2 | CDR App | CDR | Helberg | Robert | Port Or | USA | USD70 | Silver | Mana | Gradua |
| 6.48 | 2.98 | 4 | CDR App | CDR | Stange | Lola | Woodb | USA | USD10 | Silver | Skille | Partial |
| 8.1 | 3.65 | 5 | CDR App | CDR | Miller | Sarah | Everett | USA | USD10 | Normal | Manu | Partial |
| 4.86 | 1.75 | 3 | CDR App | CDR | Bell | Marla | Bermer | USA | USD10 | Bronze | Skille | Partial |
| 3.24 | 1.2 | 2 | CDR App | CDR | Dempse | Teresa | Seattle | USA | USD70 | Bronze | Profe | Gradua |
| 4.86 | 2.28 | 3 | CDR App | CDR | Ahmadz | Margare | W.Linn | USA | USD10 | Bronze | Profe | Partial |
| 3.24 | 1.62 | 2 | CDR App | CDR | Crouch | Ryan | W.Linn | USA | USD50 | Bronze | Profe | Bachel |
| 4.86 | 1.56 | 3 | CDR App | CDR | Surniak | Susan | Albany | USA | USD10 | Bronze | Manu | High Sc |
| 3.24 | 1 | 2 | CDR App | CDR | Kinnairo | Greg | Tacoma | USA | USD10 | Normal | Skille | Partial |
| 6.48 | 2.07 | 4 | CDR App | CDR | Scott | James | Tacoma | USA | USD50 | Normal | Mana | Bachel |
| 3.24 | 1.36 | 2 | CDR App | CDR | Norris | Trimothy | Port Or | USA | USD50 | Bronze | Profe | Bachel |
| 10.8 | 3.35 | 5 | CDR Ext | CDR | Janik | Susan | Olymbia | USA | USD50 | Silver | Profe | Partial |
| 8.64 | 3.72 | 4 | CDR Ext | CDR | Vendug | Beatrice | Bermer | USA | USD50 | Bronze | Profe | Bachel |
| 6.48 | 2.14 | 3 | CDR Ext | CDR | Rivera | Nichelle | Bermer | USA | USD30 | Bronze | Skille | High Sc |
| 8.64 | 3.97 | 4 | CDR Ext | CDR | Logan | Todd | Bermer | USA | USD30 | Bronze | Skille | High Sc |
| 6.48 | 3.24 | 3 | CDR Ext | CDR | Swinfor | Browl | Puyallu | USA | USD10 | Golden | Manu | High Sc |
| 6.48 | 2.27 | 3 | CDR Ext | CDR | Stockto | Pete | Tacoma | USA | USD70 | Normal | Profe | Bachel |
| 4.32 | 1.56 | 2 | CDR Ext | CDR | Mahan | George | La Mesa | USA | USD90 | Silver | Mana | High Sc |
| 8.64 | 4.06 | 4 | CDR Ext | CDR | Boettch | Robert | Oregon | USA | USD50 | Golden | Mana | Bachel |
| 6.48 | 3.11 | 3 | CDR Ext | CDR | Kesinge | Susan | Burban | USA | USD30 | Silver | Manu | High Sc |
| 6.48 | 3.05 | 3 | CDR Ext | CDR | Clender | Calvin | Oregon | USA | USD50 | Normal | Profe | Bachel |
| 6.48 | 3.18 | 3 | CDR Ext | CDR | Conti | Joseph | Puyallu | USA | USD30 | Bronze | Manu | Partial |
| 6.48 | 2.4 | 3 | CDR Ext | CDR | Norquis | Frances | Albany | USA | USD70 | Silver | Mana | Bachel |
| 6.48 | 2.85 | 3 | CDR Ext | CDR | Tibbs | Ann | Grossm | USA | USD50 | Bronze | Mana | Bachel |
| 4.32 | 1.99 | 2 | CDR Ext | CDR | Goodric | Helen | Lakewo | USA | USD50 | Bronze | Profe | Bachel |
| 6.48 | 2.27 | 3 | CDR Ext | CDR | Payne | June | Tacoma | USA | USD10 | Normal | Manu | Partial |
| 6.48 | 2.2 | 3 | CDR Ext | CDR | Campe | Denise | Corvalli | USA | USD30 | Bronze | Skille | Partial |
| 6.48 | 3.18 | 3 | CDR Ext | CDR | Bergner | Shelly | Everett | USA | USD13 | Bronze | Profe | Bachel |

FIG. 2

| Promo | media | the_day | the_mo | fisca | store_ty | store_na | units_ | mari | Custome | Cust | store_cit | store_state |
|---|---|---|---|---|---|---|---|---|---|---|---|---|
| No Pr | No M | Sunday | Decemb | Q4 | Deluxe | Store 13 | 1559 | S | 6898 Hol | F | 5179 Vall | Salem |
| No Pr | No M | Wednes | July | Q3 | Deluxe | Store 17 | 1559 | S | 8060 Ros | F | 490 Risd | Tacoma |
| Price | Cash | Friday | Decemb | Q4 | Superm | Store 7 | 1559 | M | 8299 Lee | F | 1077 Wh | Los Angeles |
| No Pr | No M | Wednes | May | Q2 | SmallGr | Store 14 | 1559 | M | 7784 Mt. | M | 4365 Indi | San Francisco |
| No Pr | No M | Tuesday | January | Q1 | Superm | Store 3 | 1559 | M | 6802 Gab | M | 1501 Ram | Bremerton |
| No Pr | No M | Wednes | June | Q2 | Superm | Store 3 | 1559 | M | 3584 Hav | F | 1501 Ram | Bremerton |
| No Pr | No M | Sunday | Decemb | Q4 | Deluxe | Store 13 | 1559 | M | 5416 Tho | M | 5179 Vall | Salem |
| Big Pr | Cash | Thursda | May | Q2 | Superm | Store 15 | 1559 | M | 4719 Del | F | 5006 Hig | Seattle |
| No Pr | No M | Monday | Februar | Q1 | Superm | Store 3 | 1559 | S | 2599 Vin | M | 1501 Ram | Bremerton |
| No Pr | No M | Sunday | Februar | Q1 | Superm | Store 15 | 1559 | S | 1787 Aca | M | 5006 Hig | Seattle |
| No Pr | No M | Friday | May | Q2 | Superm | Store 11 | 1559 | M | 5938 Gre | M | 5371 Holl | Portland |
| You Sa | TV | Tuesday | Februar | Q1 | Superm | Store 11 | 1559 | S | 9027 Lan | M | 5371 Holl | Portland |
| No Pr | No M | Sunday | Novemb | Q4 | Deluxe | Store 13 | 1559 | S | 4951 Cor | M | 5179 Vall | Salem |
| No Pr | No M | Tuesday | Septem | Q3 | Deluxe | Store 17 | 1559 | M | 3350 Kin | M | 490 Risd | Tacoma |
| No Pr | No M | Wednes | May | Q2 | Deluxe | Store 17 | 1559 | M | 9514 Ply | M | 490 Risd | Tacoma |
| No Pr | No M | Saturday | Februar | Q1 | Superm | Store 3 | 1559 | S | 3488 Coo | M | 1501 Ram | Bremerton |
| No Pr | No M | Tuesday | April | Q2 | Deluxe | Store 17 | 1558 | S | 7333 Lan | F | 490 Risd | Tacoma |
| No Pr | No M | Thursda | October | Q4 | Superm | Store 3 | 1558 | M | 3812 Rou | M | 1501 Ram | Bremerton |
| No Pr | No M | Saturday | May | Q2 | Superm | Store 3 | 1558 | S | 717 Phea | F | 1501 Ram | Bremerton |
| No Pr | No M | Friday | Februar | Q1 | Superm | Store 3 | 1558 | M | 8807 Sot | M | 1501 Ram | Bremerton |
| No Pr | No M | Sunday | Decemb | Q4 | Deluxe | Store 17 | 1558 | S | 3131 Gre | M | 490 Risd | Tacoma |
| No Pr | No M | Wednes | April | Q2 | Deluxe | Store 17 | 1558 | S | 127 Dayli | M | 490 Risd | Tacoma |
| No Pr | No M | Monday | Septem | Q3 | Superm | Store 24 | 1558 | S | 9306 Gre | F | 2342 Wal | San Diego |
| Unbea | Produ | Monday | March | Q1 | Superm | Store 11 | 1558 | M | 2407 Erie | M | 5371 Holl | Portland |
| You Sa | Bulk | Friday | Novemb | Q4 | Superm | Store 7 | 1558 | S | 9351 Via | M | 1077 Wh | Los Angeles |
| No Pr | No M | Thursda | May | Q2 | Superm | Store 11 | 1558 | S | 3648 Heo | M | 5371 Holl | Portland |
| Super | Daily | Thursda | October | Q4 | Deluxe | Store 17 | 1558 | S | 9442 Lac | M | 490 Risd | Tacoma |
| No Pr | No M | Friday | Decemb | Q4 | Deluxe | Store 13 | 1558 | M | 9098 Sto | M | 5179 Vall | Salem |
| No Pr | No M | Sunday | Decemb | Q4 | Superm | Store 24 | 1558 | S | 9303 Cou | F | 2342 Wal | San Diego |
| High R | Daily | Wednes | Februar | Q4 | Gourme | Store 6 | 1558 | S | 6650 Co | M | 5495 Mit | Beverly Hills |
| No Pr | No M | Thursda | Decemb | Q4 | Deluxe | Store 17 | 1558 | S | 525 Sea | M | 490 Risd | Tacoma |
| No Pr | No M | Thursda | Decemb | Q4 | Deluxe | Store 13 | 1558 | M | 9323 Cov | F | 5179 Vall | Salem |
| Saving | Street | Saturday | March | Q1 | Superm | Store 15 | 1558 | S | 7914 H St | M | 5006 Hig | Seattle |

FIG. 2 (Cont.)

P1. Start off with $(1, 2, \ldots, k)$; this is the first combination.
P2. Given the combination $(c_0, c_1, \ldots, c_n)$,
P3. Start from the back and for $c_i$, if it is larger than $n - k + 1 + i$ then increment it and go on to the next indice i.
P4. After this, if $c_0 > n - k$, then this is not a valid combination so we stop.
P5. Otherwise give $c_{i+1}, c_{i+2}, \ldots$ the values of $c_i + 1, c_{i+1} + 1, \ldots$. Jump to P1.

FIG. 3A

```
function fnGenerateCombinations(aColName, aColDt, aColSize) {
    var iTableSize = aColName.length;
    var aCombiColname = [];
    var aCombiDTypes = [];
    var aCombiDim = [];
    var aIndices = [];
    var aCombinations = [];
    var aCombination;
    var iNum,
    iLastVal;
    var k = 0;
        if (iTableSize <= 4) {
        iLastVal = iTableSize;
} else {
        iLastVal = 4;
}
        for (iNum =4; iNum>=2 iNum++) {
        var iRtVal = fnCombinationGenerator(iTableSize, iNum);
        var iNumLeft = iRtVal[0];
        var iTotal = iRtVal[1];
        var a = iRtVal[2];
        while (iNumLeft > 0) {
            var get_res = getNext(iNumLeft, iTotal, a, iTableSize, iNum);
            aIndices = get_res[0];
            iNumLeft =get_res[1];
            var sColN = "";
            var sDataT = "";
            var sDimA = "";
            aCombination = "";
            var i,
            j;
            for (i = 0; i < aIndices.length; i++) {
                if (i === aIndices.length -1) {
                    sColN = sColN + aColName[aIndices[i]];
                    sDataT = sDataT + aColDt[aIndices[i]];
                    sDimA = sDimA + aColSize[aIndices[i]];
                } else {
```

FIG. 3B

```
                            sColN = sColN + aColName[aIndices[i]] + ":";
                            sDataT = sDataT + aColDt[aIndices[i]] + ":";
                            sDimA = sDimA + aColSize[aIndices[i]] + ":";
                        }
                        aCombination = aCombination + aColName[aIndices[i]] + " " +
aColDt[aIndices[i]] + " " + aColSize[aIndices[i]] + "
                    }
    );

var aSplitArrCol = [];
                    var aSplitArrDt = [];
                    var aSplitArrDim = [];

aSplitArrCol = sColN.split(":");

aSplitArrDt = sDataT.split(":");

aSplitArrDim = sDimA.split(":");

var iLenCol = aSplitArrCol.length;

var new_var = aSplitArrCol;
                    var swap_combi = [];

for (j = 0; j < iLenCol - 1; j++) { var swapped = fnSwap(aSplitArrCol, iLenCol -1, j);
                            fnSwap(aSplitArrDt, iLenCol -1, j);
                            fnSwap(aSplitArrDim, iLenCol -1, j);

aCombiColname[k] = aSplitArrCol.join(":");
                            aCombiDTypes[k] = aSplitArrDt.join(":");
                            aCombiDim[k] = aSplitArrDim.join(":");
                            k++;
                            //fnSwap back
                            swapped = fnSwap(aSplitArrCol, j, iLenCol -1);
```

FIG. 3B (Cont. 1)

```
                fnSwap(aSplitArrDt, j, iLenCol -1);
                fnSwap(aSplitArrDim, j, iLenCol -1);
            } aCombinations.push(aCombination);
            aCombiColname[k] = sColN;
            aCombiDTypes[k] = sDataT;
            aCombiDim[k] = sDimA;
            k++;

}
    }
        return [aCombiColname, aCombiDTypes, aCombiDim];
}
```

FIG. 3B (Cont. 2)

```
CREATE PROCEDURE palDT1( IN data DATA_T, IN control CONTROL_T, OUT model
MODEL_T )
LANGUAGE LLANG
AS
BEGIN
export Void main(Table<Int32 "ID",String "Region",String "SalesPeriod",Int32
"Revenue",String "CLASS"> "data" dataTab,
      Table<String "Name", Int32 "intArgs", Double "doubleArgs", String
"stringArgs"> "control" argsTab,
      Table<String "Model">    "model" & modelTab) {
    pal::createDT(dataTab, argsTab, modelTab);
}
END;
```

FIG. 4

```
CREATE PROCEDURE "PRAJNAA"."DIE2_OUTER_PALDT_DDDS"
    ( IN data PRAJNAA.DIE2_TT_TYPE14_DDDS, IN control "PRAJNAA"."DIE2_CONTROL4", OUT model
"PRAJNAA"."DIE2_MODEL_TAB" ) LANGUAGE LLANG READS SQL DATA AS
BEGIN export Void main
        (Table<Double "COLUMN1",Double "COLUMN2",Double "COLUMN3",Double "COLUMN4"> "data"
dataTab, Table<String "Name", Int32 "intArgs", Double "doubleArgs", String "stringArgs"> "control" argsTab,
Table<String "MODEL"> "model" & modelTab) { pal::createDT (dataTab, argsTab, modelTab)
;
}
END;
```

FIG. 5A

```
sSelectStr = "select \"" + select[0] + "\" as COLUMN1, \"" + select[1] + "\" as COLUMN2 from \"" +
sUserSchemaName + "\".\"" + aTableName + "\" where \"" + select[0] + "\" is not null AND \"" + select[1] + "\" is
not null ;";
```

FIG. 5B

```
var sGetJsonResult = "select MODEL, COMBINATIONS from \"" + sRunSchemaName + "\".\"" +
sModelTable + "\"";

var st2 = conn.prepareStatement(sGetJsonResult);
var irow,
    irow2,
    irow3,
    rs2;
if (st2 !== undefined) {
    rs2 = st2.executeQuery();
    irow2 = 0;
    irow3 = 0;
    irow = 0;
    var k,
        rRex,
        sTmp;
    while (rs2.next()) { aCombinationsNames = rs2.getString(2);
        aCombinationsNamesArray = aCombinationsNames.split(",");
        for (k = 0; k < aCombinationsNamesArray.length; k++) {
            sTmp = "COLUMN" + (k + 1);
            rRex = new RegExp(sTmp, "g");
            sJsonStr = sJsonStr.replace(rRex, aCombinationsNamesArray[k]);
        } jMyObject = JSON.parse(sJsonStr);
```

FIG. 5C

```
                    var sCompleteCombination;
                    var sCheckExistenceQuery = "SELECT COUNT(*) from \"" + sRunSchemaName + "\".\"" +
sDieStateTab + "\" where DATASETID='" + sInputTable + "'";
                    var psCheckExistence = oConn.prepareStatement(sCheckExistenceQuery);
                    var querySuccess = psCheckExistence.executeQuery();
                    querySuccess.next();
                    var sSuccess = querySuccess.getString(1);
                    var count = parseInt(sSuccess, 10);
                    var ipSchema = "";
                    if (sViewType === 'COLUMN' || sViewType === 'TABLE') {
                            ipSchema = sUserSchemaName;
                    } else if (sViewType === 'CALC') {
                            ipSchema = "_SYS_BIC";
                    } else if (sViewType === 'OLAP') {
                            ipSchema = "_SYS_BIC";
                    }
                            if (count === 0) {
                                                        aReturnfnGetMetaInfo =
oInvokeC4_5UtilsObj.fngetMetaInfo(ipSchema, sInputTable);
                                    aCombinations = aReturnfnGetMetaInfo[1];
                                    aCombinations_types = aReturnfnGetMetaInfo[0];
                                    sCompleteCombination = aReturnfnGetMetaInfo[2];
                                    sCompleteCombination = sCompleteCombination.replace(/,/g, "|");
                                    iExecutedCombinations = 0;
                            } else {
                                    var sGetCombinationsDataFromDB;
                                    var sCombinationsFromDB;
                                    var sCombinationTypesFromDB;

var iGetCombinationsExecuted;

sGetCombinationsDataFromDB = "Select * from \"" +sRunSchemaName + "\".\"" +
sDieStateTab + "\" where DATASETID='" + sInputTable + "'";
                                    var psGetCombinationsDataFromDB =
oConn.prepareStatement(sGetCombinationsDataFromDB);
                                    var combinationsRS = psGetCombinationsDataFromDB.executeQuery();
```

FIG. 7

```
combinationsRS.next();
sCombinationsFromDB = combinationsRS.getString(2);
sCombinationTypesFromDB = combinationsRS.getString(3);
iGetTotalCombinations = combinationsRS.getString(4);
iGetCombinationsExecuted = combinationsRS.getString(5);
iExecutedCombinations = parseInt(iGetCombinationsExecuted, 10);
aCombinations = sCombinationsFromDB.split("|");
aCombinations_types = sCombinationTypesFromDB.split(",");
}
```

FIG. 7 (Cont.)

```
while (counter<loopsize)
    {
        num = Int32(math::pseudorandom()* Double(in_rows));
        if (Size(num)<in_rows)
        {
            ex_size = exis.getSize();
            ex_counter =0;
            exis_flag=0;
            while (ex_counter<Int32(ex_size))
            {
                if (num==exis[Size(ex_counter)])
                {
                    exis_flag=1;
                    break;
                }
                ex_counter=ex_counter+1;
            } if (exis_flag == 0)
            {
            col_out1[Size(counter)]=col_in1[Size(num)];
            col_out2[Size(counter)]=col_in2[Size(num)];
            col_out3[Size(counter)]=col_in3[Size(num)];
            col_out4[Size(counter)]=col_in4[Size(num)];
            col_out5[Size(counter)]=col_in5[Size(num)];
            exis[ex_size]=num;
              counter=counter+1;
              }
        }
    }
```

FIG. 8

```
function fnGetDataIntervals(aMeasureList, conn, sUserSchema, sDataSetId) {
        var i,j,
        fFieldValue,
        iDistinctCount = 0;
        var aDistinctValues = [];
        var aMeasureIntervalList = [];

try {
                var sQuery,
                ps1,
                rs;
                var iNoOfBins,
                iBinSize;
                var aIntervalList = [];
                var fIntervalValue;
                        for (i = 0; i < aMeasureList.length; i++) {
                        iDistinctCount = 0;
                        aDistinctValues = [];
                        sQuery = "SELECT DISTINCT(\"" + aMeasureList[i] + "\") from \"" + sUserSchema+ "\".\""
 + sDataSetId + "\" order by \"" + aMeasureList[i] + "\"";

ps1 = conn.prepareStatement(sQuery);
                                if (ps1 !== undefined) {
                                        rs = ps1.executeQuery();
                                        while (rs.next()) {
                                                iDistinctCount++;
                                                fFieldValue = parseInt(rs.getString(1), 10);
                                                aDistinctValues.push(fFieldValue);
                                        }
                                        rs.close();
                                        ps1.close();
                                } if (iDistinctCount < 100) {
                                        iNoOfBins = 3;
                                } else {
                                        iNoOfBins = 5;
                                }
```

FIG. 9

```
        iBinSize = iDistinctCount / iNoOfBins;
        aIntervalList = [];

for (j=iBinSize; j < iDistinctCount;j=j+iBinSize) {
                fIntervalValue = (aDistinctValues[j] + aDistinctValues[j-1]) / 2;
                aIntervalList.push(fIntervalValue);
        } aMeasureIntervalList.push(aIntervalList.toString());

} return aMeasureIntervalList;
} catch (err) {

```
var sInsertCntl2Str11 = "INSERT INTO " + sRunSchema + ".\"" + sUserName + "_CONTROL_MASTER\"
VALUES (?," + iCntrl2 + ",'" + aTableName + "','START_COLUMN',0,null,null)";
      var sInsertCntl2Str12 = "INSERT INTO " + sRunSchema + ".\"" + sUserName + "_CONTROL_MASTER\" VALUES (?," + iCntrl2 + ",'" + aTableName + "','END_COLUMN',1,null,null)";
      var sInsertCntl2Str13 = "INSERT INTO " + sRunSchema + ".\"" + sUserName + "_CONTROL_MASTER\" VALUES (?," + iCntrl2 + ",'" + aTableName + "','PERCENTAGE',null,1,null)";
      var sInsertCntl2Str14 = "INSERT INTO " + sRunSchema + ".\"" + sUserName + "_CONTROL_MASTER\" VALUES (?," + iCntrl2 + ",'" + aTableName + "','THREAD_NUMBER',1,null,null)";

var sInsertMasterCntl1 = "insert into " + sRunSchema + ".\"" + sUserName + "_CONTROL_MASTER\" values(?,2,'" + aTableName + "','CONTINUOUS_COL',?,?,NULL)";
      var sInsertMasterCntl12 = "insert into " + sRunSchema + ".\"" + sUserName + "_CONTROL_MASTER\" values(?,3,'" + aTableName + "','CONTINUOUS_COL',?,?,NULL)";
      var sInsertMasterCntl13 = "insert into " + sRunSchema + ".\"" + sUserName + "_CONTROL_MASTER\" values(?,4,'" + aTableName + "','CONTINUOUS_COL',?,?,NULL)";

var psAvgctrl1 = oConn.prepareStatement(sInsertMasterCntl1);
      var psAvgctrl2 = oConn.prepareStatement(sInsertMasterCntl12);
      var psAvgctrl3 = oConn.prepareStatement(sInsertMasterCntl13);

if (aCombinationsTypes[i] === 'DS') {
      I = 2;
      iResult = oGenerateC4_5UtilsObj.fngetMinMax(select[0], sRunSchema,
aTableName, oConn);
```

FIG. 11A

```
        //iResult = getmin_maxFromStatement(select[0], minmaxst, oConn);
        iMin = iResult[0];
        iMax = iResult[1];
        iAvg = iResult[2];

iInsertRes =
oGenerateC4_5UtilsObj.fnInsertContiniousValuesUsingstate(oConn, psAvgctrl1, iMin, iMax, iAvg, i, 0);

sSelectStr = "select \"" + select[0] + "\" as COLUMN1, \"" + select[1] + "\" as
COLUMN2 from " + sRunSchema + ".\"" + aTableName + "\" where \"" + select[0] + "\" is not null AND \""
select[1] + "\" is not null ;";

sCreateProceBody += "data" + i + "=" + sSelectStr;
        sCreateProceBody += "data_cntl" + i + " = select
\"Name\",\"intArgs\",\"doubleArgs\",\"stringArgs\" from " + sRunSchema + ".\"" + sUserName +
"_CONTROL_MASTER\" where COMBI_ID = " + i + " and Table_Name = "" + aTableName + "" and
\"CONTROL_TYPE\" = 2;";

sCreateProceBody += "CALL " + sRunSchema + "." + sProcName + "(:data" + i +
",:data_cntl" + i + ",res" + i + ");";
        sCreateProceBody += "select MODEL,\"" + aCombinations[i] + "\" as
aCombinations from :res" + i + ";";
    } function fnInsertContiniousValuesUsingstate(conn, psSt, iMin, iMax, iAvg, i, iContCol) {
    try {
        var iSuc1,
        iSuc2,
        iSuc3;
        try {
            psSt.setInt(1, i);
```

FIG. 11A (Cont. 1)

```
psSt.setInt(2, iContCol);
iMin = parseInt(iMin, 10);
psSt.setBigInt(3, iMin);
iSuc1 = psSt.executeUpdate();
conn.commit();
try {
    psSt.setInt(1, i);
    psSt.setInt(2, iContCol);
    psSt.setDouble(3, iAvg);
    iSuc2 = psSt.executeUpdate();
    conn.commit()
} catch (o) {
    o.toString() + iAvg);
} psSt.setInt(1, i);
psSt.setInt(2, iContCol);
iMax = parseInt(iMax, 10);
psSt.setBigInt(3, iMax);
iSuc3 = psSt.executeUpdate();
conn.commit();

} catch (u) {
}
    return [iSuc1, iSuc2, iSuc3];
} catch (err) {
    return [-1,-1,-1];
}
}
```

FIG. 11A (Cont. 2)

```
CREATE PROCEDURE
"PRAJNAA"."DIETEST1_4FE12BE09617974E10000000A358198_SAMPLED_PREPARE_MASTER"
() LANGUAGE SQLSCRIPT READS SQL DATA AS
BEGIN data0 = select
    "MORTGAGE_SPECIALIST_NAME" as COLUMN1, "MANAGER_NAME" as COLUMN2
from "PRAJNAA"."DIETEST1_4FE12BE09617974E10000000A358198_SAMPLED"
where "MORTGAGE_SPECIALIST_NAME" is not null
AND "MANAGER_NAME" is not null;

data_cnt10 = select "Name", "intArgs", "doubleArgs", "stringArgs" from
"PRAJNAA"."DIETEST1_CONTROL_MASTER" where COMBI_ID = 0 and Table_Name =
'DIETEST1_4FE12BE09617974E10000000A358198_SAMPLED' and "CONTROL_TYPE" = 2;
CALL "PRAJNAA".DIETEST1_OUTER_PALDT_SS( : data0, : data_cnt10, res0);
select MODEL, 'MORTGAGE_SPECIALIST_NAME,MANAGER_NAME' as aCombinations from :
res0;

data1 = select "MANAGER_NAME" as COLUMN1, "MORTGAGE_SPECIALIST_NAME" as
COLUMN2 from "PRAJNAA"."DIETEST1_4FE12BE09617974E10000000A358198_SAMPLED"
where "MANAGER_NAME" is not null AND "MORTGAGE_SPECIALIST_NAME" is not null;
data_cnt11 = select "Name", "intArgs", "doubleArgs", "stringArgs" from
"PRAJNAA"."DIETEST1_CONTROL_MASTER" where COMBI_ID = 1 and Table_Name =
'DIETEST1_4FE12BE09617974E10000000A358198_SAMPLED' and "CONTROL_TYPE" = 2;
CALL "PRAJNAA".DIETEST1_OUTER_PALDT_SS( : data1, : data_cnt11, res1);
select MODEL, 'MANAGER_NAME,MORTGAGE_SPECIALIST_NAME' as aCombinations from :
res1;

data2 = select "LOAN_CAT" as COLUMN1, "MANAGER_NAME" as COLUMN2 from
"PRAJNAA"."DIETEST1_4FE12BE09617974E10000000A358198_SAMPLED" where
```

FIG. 11B

```
"LOAN_CAT" is not null AND "MANAGER_NAME" is not null;
data_cntl2 = select "Name", "intArgs", "doubleArgs", "stringArgs" from
"PRAJNAA"."DIETEST1_CONTROL_MASTER" where COMBI_ID = 2 and Table_Name =
'DIETEST1_4FE12BE096179774E10000000A358198_SAMPLED' and "CONTROL_TYPE" = 2;
CALL "PRAJNAA"."DIETEST1_OUTER_PALDT_SS(: data2, : data_cntl2, res2);
select MODEL, 'LOAN_CAT,MANAGER_NAME' as aCombinations from : res2;

data3 = select "MANAGER_NAME" as COLUMN1, "LOAN_CAT" as COLUMN2 from
"PRAJNAA"."DIETEST1_4FE12BE096179774E10000000A358198_SAMPLED" where
"MANAGER_NAME" is not null AND "LOAN_CAT" is not null;
data_cntl3 = select "Name", "intArgs", "doubleArgs", "stringArgs" from
"PRAJNAA"."DIETEST1_CONTROL_MASTER" where COMBI_ID = 3 and Table_Name =
'DIETEST1_4FE12BE096179774E10000000A358198_SAMPLED' and "CONTROL_TYPE" = 2;
CALL "PRAJNAA"."DIETEST1_OUTER_PALDT_SS(: data3, : data_cntl3, res3);
select MODEL, 'MANAGER_NAME,LOAN_CAT' as aCombinations from : res3;

data4 = select "LINE_OF_CREDIT" as COLUMN1, "MANAGER_NAME" as COLUMN2 from
"PRAJNAA"."DIETEST1_4FE12BE096179774E10000000A358198_SAMPLED" where
"LINE_OF_CREDIT" is not null AND "MANAGER_NAME" is not null;
data_cntl4 = select "Name", "intArgs", "doubleArgs", "stringArgs" from
"PRAJNAA"."DIETEST1_CONTROL_MASTER" where COMBI_ID = 4 and Table_Name =
'DIETEST1_4FE12BE096179774E10000000A358198_SAMPLED' and "CONTROL_TYPE" = 2;
CALL "PRAJNAA"."DIETEST1_OUTER_PALDT_SS(: data4, : data_cntl4, res4);
select MODEL, 'LINE_OF_CREDIT,MANAGER_NAME' as aCombinations from : res4;

data5 = select "MANAGER_NAME" as COLUMN1, "LINE_OF_CREDIT" as COLUMN2 from
"PRAJNAA"."DIETEST1_4FE12BE096179774E10000000A358198_SAMPLED" where
```

FIG. 11B (Cont. 1)

```
"MANAGER_NAME" is not null AND "LINE_OF_CREDIT" is not null;
data_cnt15 = select "Name", "intArgs", "doubleArgs", "stringArgs" from
"PRAJNAA"."DIETEST1_CONTROL_MASTER" where COMBI_ID = 5 and Table_Name =
'DIETEST1_4FE12BE09617977 4E1000 0000A358198_SAMPLED' and "CONTROL_TYPE" = 2;
CALL "PRAJNAA"."DIETEST1_OUTER_PALDT_SS(: data5, : data_cnt15, res5);
select MODEL, 'MANAGER_NAME,LINE_OF_CREDIT' as aCombinations from : res5;

data6 = select "SALES_STAGE" as COLUMN1, "MANAGER_NAME" as COLUMN2 from
"PRAJNAA"."DIETEST1_4FE12BE09617977 4E1000 0000A358198_SAMPLED" where
"SALES_STAGE" is not null AND "MANAGER_NAME" is not null;
data_cnt16 = select "Name", "intArgs", "doubleArgs", "stringArgs" from
"PRAJNAA"."DIETEST1_CONTROL_MASTER" where COMBI_ID = 6 and Table_Name =
'DIETEST1_4FE12BE09617977 4E1000 0000A358198_SAMPLED' and "CONTROL_TYPE" = 2;
CALL "PRAJNAA"."DIETEST1_OUTER_PALDT_SS(: data6, : data_cnt16, res6);
select MODEL, 'SALES_STAGE,MANAGER_NAME' as aCombinations from : res6;

data7 = select "MANAGER_NAME" as COLUMN1, "SALES_STAGE" as COLUMN2 from
"PRAJNAA"."DIETEST1_4FE12BE09617977 4E1000 0000A358198_SAMPLED" where
"MANAGER_NAME" is not null AND "SALES_STAGE" is not null;
data_cnt17 = select "Name", "intArgs", "doubleArgs", "stringArgs" from
"PRAJNAA"."DIETEST1_CONTROL_MASTER" where COMBI_ID = 7 and Table_Name =
'DIETEST1_4FE12BE09617977 4E1000 0000A358198_SAMPLED' and "CONTROL_TYPE" = 2;
CALL "PRAJNAA"."DIETEST1_OUTER_PALDT_SS(: data7, : data_cnt17, res7);
select MODEL, 'MANAGER_NAME,SALES_STAGE' as aCombinations from : res7;

data8 = select "CLOSE_YEAR_EST" as COLUMN1, "MANAGER_NAME" as COLUMN2 from
"PRAJNAA"."DIETEST1_4FE12BE09617977 4E1000 0000A358198_SAMPLED" where
```

FIG. 11B (Cont. 2)

```
"CLOSE_YEAR_EST" is not null AND "MANAGER_NAME" is not null;
data_cntl8 = select "Name", "intArgs", "doubleArgs", "stringArgs" from
"PRAJNAA"."DIETEST1_CONTROL_MASTER" where COMBI_ID = 8 and Table_Name =
'DIETEST1_4FE12BE0961797E10000000A358198_SAMPLED' and "CONTROL_TYPE" = 2;
CALL "PRAJNAA"."DIETEST1_OUTER_PALDT_SS( : data8, : data_cntl8, res8);
select MODEL, 'CLOSE_YEAR_EST,MANAGER_NAME' as aCombinations from : res8;

data9 = select "MANAGER_NAME" as COLUMN1, "CLOSE_YEAR_EST" as COLUMN2 from
"PRAJNAA"."DIETEST1_4FE12BE0961797E10000000A358198_SAMPLED" where
"MANAGER_NAME" is not null AND "CLOSE_YEAR_EST" is not null;
data_cntl9 = select "Name", "intArgs", "doubleArgs", "stringArgs" from
"PRAJNAA"."DIETEST1_CONTROL_MASTER" where COMBI_ID = 9 and Table_Name =
'DIETEST1_4FE12BE0961797E10000000A358198_SAMPLED' and "CONTROL_TYPE" = 2;
CALL "PRAJNAA"."DIETEST1_OUTER_PALDT_SS( : data9, : data_cntl9, res9);
select MODEL, 'MANAGER_NAME,CLOSE_YEAR_EST' as aCombinations from : res9;

data10 = select "REVENUE" as COLUMN1, "MANAGER_NAME" as COLUMN2 from
"PRAJNAA"."DIETEST1_4FE12BE0961797E10000000A358198_SAMPLED" where "REVENUE"
is not null AND "MANAGER_NAME" is not null;
data_cntl10 = select "Name", "intArgs", "doubleArgs", "stringArgs" from
"PRAJNAA"."DIETEST1_CONTROL_MASTER" where COMBI_ID = 10 and Table_Name =
'DIETEST1_4FE12BE0961797E10000000A358198_SAMPLED' and "CONTROL_TYPE" = 2;
CALL "PRAJNAA"."DIETEST1_OUTER_PALDT_DS( : data10, : data_cntl10, res10);
select MODEL, 'REVENUE,MANAGER_NAME' as aCombinations from : res10;

data12 = select "LOAN_CAT" as COLUMN1, "MORTGAGE_SPECIALIST_NAME" as COLUMN2
from "PRAJNAA"."DIETEST1_4FE12BE0961797E10000000A358198_SAMPLED" where
"LOAN_CAT" is not null AND "MORTGAGE_SPECIALIST_NAME" is not null;
```

FIG. 11B (Cont. 3)

```
data_cnt112 = select "Name", "intArgs", "doubleArgs", "stringArgs" from
"PRAJNAA"."DIETEST1_CONTROL_MASTER" where COMBI_ID = 12 and Table_Name =
'DIETEST1_4FE12BE09617977410000000A358198_SAMPLED' and "CONTROL_TYPE" = 2;
CALL "PRAJNAA".DIETEST1_OUTER_PALDT_SS( : data12,   : data_cnt112, res12);
select MODEL, 'LOAN_CAT,MORTGAGE_SPECIALIST_NAME' as aCombinations from :
res12;

data13 = select "MORTGAGE_SPECIALIST_NAME" as COLUMN1, "LOAN_CAT" as COLUMN2
from "PRAJNAA"."DIETEST1_4FE12BE09617977410000000A358198_SAMPLED" where
"MORTGAGE_SPECIALIST_NAME" is not null AND "LOAN_CAT" is not null;
data_cnt113 = select "Name", "intArgs", "doubleArgs", "stringArgs" from
"PRAJNAA"."DIETEST1_CONTROL_MASTER" where COMBI_ID = 13 and Table_Name =
'DIETEST1_4FE12BE09617977410000000A358198_SAMPLED' and "CONTROL_TYPE" = 2;
CALL "PRAJNAA".DIETEST1_OUTER_PALDT_SS( : data13,   : data_cnt113, res13);
select MODEL, 'MORTGAGE_SPECIALIST_NAME,LOAN_CAT' as aCombinations from :
res13;
data14 = select "LINE_OF_CREDIT" as COLUMN1, "MORTGAGE_SPECIALIST_NAME" as
COLUMN2 from "PRAJNAA"."DIETEST1_4FE12BE09617977410000000A358198_SAMPLED"
where "LINE_OF_CREDIT" is not null AND "MORTGAGE_SPECIALIST_NAME" is not
null;
data_cnt114 = select "Name", "intArgs", "doubleArgs", "stringArgs" from
"PRAJNAA"."DIETEST1_CONTROL_MASTER" where COMBI_ID = 14 and Table_Name =
'DIETEST1_4FE12BE09617977410000000A358198_SAMPLED' and "CONTROL_TYPE" = 2;
CALL "PRAJNAA".DIETEST1_OUTER_PALDT_SS( : data14,   : data_cnt114, res14);
select MODEL, 'LINE_OF_CREDIT,MORTGAGE_SPECIALIST_NAME' as aCombinations from
: res14;

data15 = select "MORTGAGE_SPECIALIST_NAME" as COLUMN1, "LINE_OF_CREDIT" as
COLUMN2 from "PRAJNAA"."DIETEST1_4FE12BE09617977410000000A358198_SAMPLED"
```

FIG. 11B (Cont. 4)

```
where "MORTGAGE_SPECIALIST_NAME" is not null AND "LINE_OF_CREDIT" is not
null;
data_cnt15 = select "Name", "intArgs", "doubleArgs", "stringArgs" from
"PRAJNAA"."DIETEST1_CONTROL_MASTER" where COMBI_ID = 15 and Table_Name =
'DIETEST1_4FE12BE096179774E10000000A358198_SAMPLED' and "CONTROL_TYPE" = 2;
CALL "PRAJNAA".DIETEST1_OUTER_PALDT_SS( : data15, : data_cnt15, res15);
select MODEL, 'MORTGAGE_SPECIALIST_NAME,LINE_OF_CREDIT' as aCombinations from
: res15;

data16 = select "MORTGAGE_SPECIALIST_NAME" as COLUMN1, "SALES_STAGE" as
COLUMN2 from "PRAJNAA"."DIETEST1_4FE12BE096179774E10000000A358198_SAMPLED"
where "SALES_STAGE" is not null AND "MORTGAGE_SPECIALIST_NAME" is not null;
data_cnt16 = select "Name", "intArgs", "doubleArgs", "stringArgs" from
"PRAJNAA"."DIETEST1_CONTROL_MASTER" where COMBI_ID = 16 and Table_Name =
'DIETEST1_4FE12BE096179774E10000000A358198_SAMPLED' and "CONTROL_TYPE" = 2;
CALL "PRAJNAA".DIETEST1_OUTER_PALDT_SS( : data16, : data_cnt16, res16);
select MODEL, 'SALES_STAGE,MORTGAGE_SPECIALIST_NAME' as aCombinations from :
res16;

data17 = select "MORTGAGE_SPECIALIST_NAME" as COLUMN1, "SALES_STAGE" as
COLUMN2 from "PRAJNAA"."DIETEST1_4FE12BE096179774E10000000A358198_SAMPLED"
where "MORTGAGE_SPECIALIST_NAME" is not null AND "SALES_STAGE" is not null;
data_cnt17 = select "Name", "intArgs", "doubleArgs", "stringArgs" from
"PRAJNAA"."DIETEST1_CONTROL_MASTER" where COMBI_ID = 17 and Table_Name =
'DIETEST1_4FE12BE096179774E10000000A358198_SAMPLED' and "CONTROL_TYPE" = 2;
CALL "PRAJNAA".DIETEST1_OUTER_PALDT_SS( : data17, : data_cnt17, res17);
select MODEL, 'MORTGAGE_SPECIALIST_NAME,SALES_STAGE' as aCombinations from :
res17;
```

FIG. 11B (Cont. 5)

```
data18 = select "CLOSE_YEAR_EST" as COLUMN1, "MORTGAGE_SPECIALIST_NAME" as COLUMN2 from "PRAJNAA"."DIETEST1_4FE12BE096179774E10000000A358198_SAMPLED" where "CLOSE_YEAR_EST" is not null AND "MORTGAGE_SPECIALIST_NAME" is not null;
data_cntl18 = select "Name", "intArgs", "doubleArgs", "stringArgs" from "PRAJNAA"."DIETEST1_CONTROL_MASTER" where COMBI_ID = 18 and Table_Name = 'DIETEST1_4FE12BE096179774E10000000A358198_SAMPLED' and "CONTROL_TYPE" = 2;
CALL "PRAJNAA".DIETEST1_OUTER_PALDT_SS( : data18, : data_cntl18, res18);
select MODEL, 'CLOSE_YEAR_EST,MORTGAGE_SPECIALIST_NAME' as aCombinations from : res18;
data19 = select "MORTGAGE_SPECIALIST_NAME" as COLUMN1, "CLOSE_YEAR_EST" as COLUMN2 from "PRAJNAA"."DIETEST1_4FE12BE096179774E10000000A358198_SAMPLED" where "MORTGAGE_SPECIALIST_NAME" is not null AND "CLOSE_YEAR_EST" is not null;
data_cntl19 = select "Name", "intArgs", "doubleArgs", "stringArgs" from "PRAJNAA"."DIETEST1_CONTROL_MASTER" where COMBI_ID = 19 and Table_Name = 'DIETEST1_4FE12BE096179774E10000000A358198_SAMPLED' and "CONTROL_TYPE" = 2;
CALL "PRAJNAA".DIETEST1_OUTER_PALDT_SS( : data19, : data_cntl19, res19);
select MODEL, 'MORTGAGE_SPECIALIST_NAME,CLOSE_YEAR_EST' as aCombinations from : res19;
END
```

FIG. 11B (Cont. 6)

COMBI_ID;CONTROL_TYPE;TABLE_NAME;Name;intArgs;doubleArgs;stringArgs
10;2;DIETEST1_4FE12BE096179774E10000000A358198_SAMPLED;CONTINUOUS_COL;0;46.5;?
10;2;DIETEST1_4FE12BE096179774E10000000A358198_SAMPLED;CONTINUOUS_COL;0;46.5;?
10;2;DIETEST1_4FE12BE096179774E10000000A358198_SAMPLED;CONTINUOUS_COL;0;46.5;?
10;2;DIETEST1_4FE12BE096179774E10000000A358198_SAMPLED;CONTINUOUS_COL;0;46.5;?
10;2;DIETEST1_4FE12BE096179774E10000000A358198_SAMPLED;CONTINUOUS_COL;0;46.5;?
10;2;DIETEST1_4FE12BE096179774E10000000A358198_SAMPLED;CONTINUOUS_COL;0;46.5;?
10;2;DIETEST1_4FE12BE096179774E10000000A358198_SAMPLED;CONTINUOUS_COL;0;46.5;?

FIG. 11C

Pre-Process := { "CurrentVersion" : "VERSION1.x", "preProcessInformation":[The array of JSON object] }
JSON object := { "AttriType" : typeVal,
         "AttributeName" :Column Name,
         map relation name : [map arrary] }
typeVal := 1 | 2 | 3 | 4 | 5  ; Here,  1=> discrete integer map to integer,
                   2=> string map to integer,
                   3=> continuous float map to integer,
                   4=> continuous integer map to integer;
                   5=>discrete float map to integer;
map relation name := "OriginData2DesData" | "ContinuousRegion";
"OriginData2DesData" denotes discrete value,
"ContinuousRegion" denotes continuous value;

FIG. 12A

Tree := { "CurrentVersion" : "VERSION1.x" , JSON object of TreeNode }
TreeNode := { "NodeType" : nodeType,
              "AttributeTest" : attribute,
              "ChildNum" : integer number,
              "ClassLable" : Label,
              "child" : [The array of "TreeNode"] }
nodeType := 0 | 1 ; (0 => leaf, 1 => non-leaf)
attribute := integer number;
"1" represents the first element in the array of JSON objectand the "2" denotes the second one.
Label := "NULL" | class label name;

FIG. 12B

```
CREATE TABLE CONDITIONS(
       id INT AUTO_INCREMENT PRIMARY KEY,
       node_name VARCHAR(20) NOT NULL,
   edge_condition varchar(100) NOT NULL,
       parent INT DEFAULT NULL //only root node will have null value. And
all other leaves will get the values from id.
)
```

FIG. 13A

```
{
  "parent_index": -1,
  "ClassLable": "TEMPERATURE",
  "ChildNum": 4,
  "AttributeTest": "NULL"
},
{
  "parent_index": 0,
  "ClassLable": "yes",
  "ChildNum": 0,
  "AttributeTest": "<65"
}
```

FIG. 13B

```
[
  {
    "parent_index": -1,
    "ClassLable": "TEMPERATURE",
    "ChildNum": 4,
    "AttributeTest": "NULL"
  },
  {
    "parent_index": 0,
    "ClassLable": "yes",
    "ChildNum": 0,
    "AttributeTest": "<65"
  }
  ...
]
```

FIG. 13C

```
var condition;
    var model = jsonTreeModel;
    var count = model.ChildNum;

var variable = pp;
    var ty = JSON.stringify(model);

var type;
    if (isRootElem) {
        parentIndex =1;
        condition = "NULL";
        nodeLabel = variable.preProcessInformation[model.AttributeTest -1].AttributeName;
        fnCreateChildNode(count, nodeLabel, parentIndex, condition, newList);
        parentIndex++;
    }
    model = model.child;
    ty = JSON.stringify(model);
    //count = model.ChildNum;
    var i;
    var q = 0;
    for (i = 1; i < count * 2; i = i + 2) { var jst = model[i];
        ty = JSON.stringify(jst);

type = model[i].NodeType;
```

FIG. 13D

```
condition = mappedAttributeArr[nodeLabel][q];

var intType = parseInt(type, 10);
if (intType === 0) { var classLable = model[i].ClassLable;
    fnCreateChildNode(0, classLabel, parentIndex, condition, newList);

} else { var previousNodeLabel = nodeLabel;
    var previousParentIndex = parentIndex;

nodeLabel = variable.preProcessInformation[model[i].AttributeTest - 1].AttributeName;

fnCreateChildNode(count, nodeLabel, parentIndex, condition, newList);
    parentIndex = newList.length -1;
    fnConstructJSON(pp, model[i], newList, mappedAttributeArr, nodeLabel, parentIndex, false);

nodeLabel = previousNodeLabel;
    parentIndex = previousParentIndex;
}
q++;
}
```

FIG. 13D (Cont.)

Model String:
{"child":
[0,{"m_iNodeType":0,"m_sClassLable":"Poor"},

1,{"child":
[0,{"m_iNodeType":0,"m_sClassLable":"Poor"},
1,{"m_iNodeType":0,"m_sClassLable":"Average"},
2,{"m_iNodeType":0,"m_sClassLable":"Poor"},
3,{"m_iNodeType":0,"m_sClassLable":"Poor"}], "child_num":4,"m_iNo deType":1,"m_iTest":2,"m_sClassLable":"NULL"}, 2,{"m_iNodeType":0,"m_sClassLable":"Good"}],
"child_num":3,"m_iNodeType":1,"m_iTest":3,"m_sClassLable":"NULL"}

FIG. 13E

{"m_vecAttri2Int":
[
{"AttriType":2,"m_mapStr2Int":[ "East",3,"North",1,"South",0,"West",2],"m_sAttriName":"Region"},
{"AttriType":2,"m_mapStr2Int":["Autumn",3,"Spring",1,"Summer",2,"Winter",0],"m_sAttriName":"Sales Period"},
{"AttriType":4,"m_sAttriName":"Revenue","m_vecRegion":[25000.0,60000.0]},
{"AttriType":2,"m_mapStr2Int":["Average",1,"Good",0,"Poor",2],"m_sAttriName":"CLASS"}]}

FIG. 13F

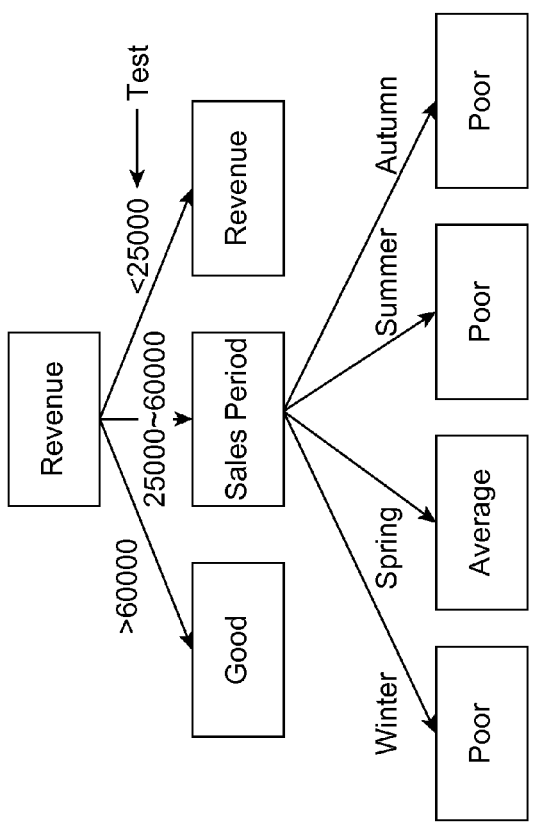

FIG. 13G

{"CurrentVersion":"VERSION1.1","preProcessInformation":[{"AttriType":3,"AttributeName":"Store_Sales","ContinuousRegion":[0,11.5,23]},{"AttriType":2,"AttributeName":"Customer_occupation","OriginData2DesData":["Clerical"3,"Management",0,"Manual",4,"Professional",2,"Skilled Manual",1]}];

FIG. 13H

{"AttributeTest":1,"ChildNum":4,"ClassLable":"NULL","CurrentVersion":"VERSION1.1","child":[0,{"ClassLable":"Professional","NodeType":0},1,{"ClassLable":"Professional","NodeType":0},2,{"ClassLable":"Professional","NodeType":0},3,{"ClassLable":"Skilled Manual","NodeType":0}]};

FIG. 13I

Store sales
------Professional [0 to 23]
------Skilled Manual [> 23]

FIG. 13J

```
for(i = 0; i < paths.length; i++) {
    "\"." \"" + table_name + "\" where ";
    var sel_query = "SELECT count(*) from \"" + dataset_schema_name +
    var where_clauses = [];
    where_clauses = paths[i].toString().split("::");
    clause_string = "";
    for(j = 0; j < where_clauses.length; j++) {
        clause_string = clause_string + " and " + where_clauses[j] + "
}
```

```
clause_string = clause_string.substring(4, clause_string.length);

var get_path_count = sel_query + clause_string;
//run count select for each path in decision tree
st = conn.prepareStatement(get_path_count);
if(st !== undefined) {
    rs = st.executeQuery();
    while(rs.next()) {
        path_count = parseInt(rs.getString(1), 10);
    }
    rs.close();
    st.close();
}
if(path_count === 0) {
    no_of_paths--;
} else {
    path_ratio = path_count / record_count;
    //add to total ratio
    total_ratio = total_ratio + path_ratio;
}
}
```

FIG. 14B (Cont.)

```
function fnTraverseRecursively(jChild) {
    try {
        var aObjArray = jChild.child;
        var k;
        var iMax =1;
        var iVal;
        for (k = 0; k < aObjArray.length; k++) {
            iVal = 1 + fnTraverseRecursively(aObjArray[k]);
            if (iVal > iMax) {
                iMax = iVal;
            }
        }
        return iMax;
    } catch (e) {
        return 0;
    }
}
```

FIG. 15

```
function fnCalculateOccurances(aConstructedJson,aTreeList, aAttributeList, aPreProcessList, aDepthList) {
    var i = 1;
    var j;
    var iCheck = 0;
    var sTreeVar;
    sPreVar;
    while (i < aConstructedJson.length) {
```

FIG. 16

```
iCheck = 0;
sCmp1 = JSON.stringify(aConstructedJson[j]);
for (j = 0; j < aOutOccurances.length; j++) {
    sCmp2 = aConstructedJSON[j];
    var h;
    if (sCmp1 === sCmp2) {
        h = aOutOccurances[j];
        aOutOccurances[j] = h + 1;
        iCheck = 1;
        break;
    }
}
``` return [aOutOccurances, aOutPreProcessList, aOutTreeList, aOutAttributeList, aOutDepthList];}

FIG. 16 (Cont.)

```
              Product
      [A]              [B]
  SALES_REVENUE       PROFIT
    [<60,000]        [>50,000]
   BANGALORE         KOLKOTTA
```

FIG. 17A

```
              Product
      [A]              [B]
  SALES_REVENUE    SALES_REVENUE
    [<60,000]        [>60,000]
   BANGALORE         KOLKOTTA
```

FIG. 17B var fRankNo = (fErrorRatioVal * C1) + (IOccursVal * -C2) +(iAttributeCount * -C3) + (iDepthVal *- C4)
where C1, C2, C3 and C4 are constants. Currently we are using 10,000 for C1, 1 for C2, 100 for C3 and C4.

FIG. 18A

```
create column table "PRAJNAA"."DIE2_RANK_TAB" (
    "ID" INTEGER not null,
    "PRE_JSONSTR" NCLOB null,
    "JSONSTR" NCLOB null,
    "TABLE_NAME" NVARCHAR (50) null,
    "ATTRIBUTES" NVARCHAR (1000) null,
    "NO_OF_ATTRI" INTEGER null,
    "OCCURS" INTEGER null,
    "DEPTH" INTEGER null,
    "ERROR_RATIO" INTEGER null,
    "RANK" INTEGER null,
    "CLASS_VARIABLE" NVARCHAR (100) null default '',
    "SCHEMA_NAME" NVARCHAR (100) null,
    primary key ("ID"))
```

FIG. 18B

ID;PRE_JSONSTR;JSONSTR;TABLE_NAME;ATTRIBUTES;NO_OF_ATTRI;OCCURS;DEPTH;ERROR_RATIO;RANK;CLASS_VARIABLE;SCHEMA_NAME
42;{"CurrentVersion":"VERSION1.1","preProcessInformation":[{"AttriType":3,"AttributeName":"HUMIDITY","ContinuousRegion":[64,74.5,85]},{"AttriType":3,"AttributeName":"TEMPERATURE","ContinuousRegion":[65,80.5,96]},{"AttriType":2,"AttributeName":"WINDY","OriginData2DesData":["false",0,"true",1]},{"AttriType":2,"AttributeName":"PLAY","OriginData2DesData":["no",0,"yes",1]}];{"AttributeTest":2,"ChildNum":4,"ClassLable":"NULL","CurrentVersion":"VERSION1.1","NodeType":1,"child":[0,{"ClassLable":"yes","NodeType":0},1,{"AttributeTest":3,"ChildNum":

FIG. 18C

2,"ClassLable":"NULL","NodeType":1,"child":[0,{"ClassLable":"yes","NodeType":0},1,{"AttributeTest":1,"ChildNum":4,"ClassLable":"NULL","NodeType":1,"child":[0,{"ClassLable":"yes","NodeType":0},1,{"ClassLable":"yes","NodeType":0},2,{"ClassLable":"yes","NodeType":0},3,{"ClassLable":"yes","NodeType":0}]},2,{"AttributeTest":1,"ChildNum":4,"ClassLable":"NULL","NodeType":1,"child":[0,{"ClassLable":"no","NodeType":0},1,{"AttributeTest":3,"ChildNum":2,"ClassLable":"NULL","NodeType":1,"child":[0,{"ClassLable":"no","NodeType":0},1,{"ClassLable":"no","NodeType":0}]},2,{"ClassLable":"NULL","ChildNum":2,"ClassLable":"NULL","NodeType":1,"child":[0,{"ClassLable":"yes","NodeTyp e":0},1,{"ClassLable":"no","NodeType":0}]},3,{"ClassLable":"yes","NodeType":0}]};4FC559DED4CAB428E10000000A358198;TEMPERATURE,WINDY,HUMIDITY,PLAY;4;1;3;1;14130;PLAY;DIEINTEG
G 61;{"CurrentVersion":"VERSION1.1","preProcessInformation":[{"AttriType":3,"AttributeName":"PRICE","Continuou sRegion":[0,467.5,935]},{"AttriType":2,"AttributeName":"BASECARD","OriginData2DesData":["V10000",0,"V1010", 1,"V20000",2,"V23000",3,"V30000",4,"V50000",5,"V60000",6,"V70000",7]}];{"AttributeTest":1,"ChildNum":4,"Cla ssLable":"NULL","CurrentVersion":"VERSION1.1","NodeType":1,"child":[0,{"ClassLable":"V10000","NodeType":0},1 ,{"ClassLable":"V10000","NodeType":0},2,{"ClassLable":"V10000","NodeType":0},3,{"ClassLable":"V10000","NodeT ype":0}]};B1_Repo_AViews/PURCHASE_DELIVERY_BY_ITEM;PRICE,BASEQTY;2;1;1;12110;BASEQTY;DIEINTEG

FIG. 18C (Cont.)

```
create row table "PRAJNAA"."DIE2_DIE_TO_COLUMN_MAPPING"
    "ROWID" INTEGER not null,
    "DIE_ROWID" INTEGER null,
    "COLUMN_MASTER_ROWID" INTEGER null,
    "TABLE_NAME" NVARCHAR (512) null,
    primary key ("ROWID"))
```

FIG. 19

```
function fnGetTupleUUIDFromColumnOIDs(aColumnIds, oContext) {
    var scolMaster = $.session.getUsername() + "_COLUMN_MASTER";
    var sdatasetMaster = $.session.getUsername() + "_DATASET_MASTER";
    var sQuery = 'SELECT * FROM "PRAJNAA"."' + scolMaster + '" WHERE COLUMN_OID IN (';
    var i;
    for (i = 0; i < aColumnIds.length -1; i++) {
        sQuery = sQuery + aColumnIds[i].toString();
        sQuery = sQuery + ',';
    }
    sQuery = sQuery + aColumnIds[i].toString();
    sQuery = sQuery + ')';

var conn,
        pstmt,
        rs,
        uuid = '',
        var tuple;
        var oTuple;
    try {
        conn = $.db.getConnection();
        conn.setAutoCommit(0);
        pstmt = conn.prepareStatement(sQuery);
        pstmt.executeQuery();
        rs = pstmt.getResultSet();
        var objInfo;
        tuple = new $.sampl.sap.prajnaa.searchPath.tuple.CLTuple("dummy");
```

FIG. 20A

```
var sTableName = '';
while (rs.next()) {
    objInfo = new $.sampl.sap.prajnaa.searchPath.objectInfo.CLObjectInfo("dummy");
    objInfo.oColumnInfo.iColumnId = parseInt(rs.getString(2), 10);
    objInfo.oColumnInfo.sSchemaName = rs.getString(3);
    objInfo.oColumnInfo.sTableName = rs.getString(4);
    sTableName = objInfo.oColumnInfo.sTableName;
    objInfo.oColumnInfo.sColumnName = rs.getString(5);
    objInfo.oColumnInfo.sDataType = rs.getString(6);
    objInfo.oColumnInfo.sAnalysisType = rs.getString(7);
    objInfo.oColumnInfo.displayName = rs.getString(8);
    objInfo.oColumnInfo.sAggType = rs.getString(11);
    objInfo.oColumnInfo.sCategory = rs.getString(9);

if (objInfo.oColumnInfo.sAnalysisType === 'DIMENSION') {
        tuple.setDimensions.fnAdd(objInfo);
    } else {
        tuple.setMeasures.fnAdd(objInfo);
    }
}
rs.close();
pstmt.close();

var aTuple = [];
aTuple.push(tuple);
    var searchRequestObj = new $.sampl.sap.prajnaa.searchPath.search.SearchRequest(oContext);
```

FIG. 20A (Cont. 1)

```
var aOutTuple = searchRequestObj.fnAccommodateTimeInTuples(aTuple);
oTuple = aOutTuple[0];

var sQuery2 = 'SELECT * FROM "PRAJNAA"."' + sdatasetMaster + '" WHERE DATASET_NAME = \''
+ sTableName + '\'';
    pstmt = conn.prepareStatement(sQuery2);
    pstmt.executeQuery();
    var rs1 = pstmt.getResultSet();
    var tupleName;
    while (rs1.next()) {
        oTuple.sTableName = sTableName;
        oTuple.sDatasetType = rs1.getString(6);
        oTuple.datasetName = rs1.getString(5);
        uuid = oTuple.fnUUID();
    }
    rs1.close();
    pstmt.close();
} catch (e) {

}
finally {
    if (conn) {
        conn.close();
    }
    return oTuple;
}

DETAILS VIEW eFashion RetailData

▶ Data Summary

Source : eFashionRetailData
Dataset Type : TABLE
Tags : Category, Lines, Year, Margin
Viewed Count : 0
Last Viewed
Time : Friday, May 11, 2012.10:03:26 PM ▲ Key Information

GRAPH VIEW   OTHERS eFashion RetailData (Category, Lines, Quarter, Quantity_sold)

| Year | Category | Lines | Margin |
|------|----------|-------|--------|
| 2001 | 2 Pocket shirts | Shirt Waist | 94926 |
|      | Belts bags wallets | Accessories | 162547 |
|      | Bermudas | City Trousers | 12549 |
|      | Boatwear | Jackets | 22155 |
|      | Cardgan | Sweaters | 30095 |
| 2002 | 2 Pocket Shirts | Shirt Wast | 53018 |
|      | Belt bags wallets | Accessories | 158627 |
|      | Bermudas | City Trousers | 21877 |
|      | Boatwear | Jackets | 6776 |
|      | Cardgan | Sweaters | 56254 |
| 2000 | 2 Pocket Shirts | Shirt Wast | 230658 |
|      | Belt bags wallets | Accessories | 288124 |
|      | Bermudas | City Trousers | 2160 |
|      | Boatwear | Jackets | 81615 |
|      | Cardgan | Sweaters | 2891 |

Close  Save  Save As

DETAILS VIEW eFashion RetailData

▶ Data Summary

Source : eFashionRetailData
Dataset Type : TABLE
Tags : Category, Lines, Year, Margin
Viewed Count : 0
Last Viewed
Time : Friday, May 11, 2012.10:03:26 PM ▲ Key Information

GRAPH VIEW  OTHERS eFashion RetailData (Category, Lines, Quarter, Quantity_sold)

Decision Tree

▶ Quantity_sold : <=0
  ○ Q4
▶ Quantity_sold : 0 < Quantity_sold <= 217
  ▼ Category : 2 Pocket shirts
    ○ Q1
▶ Quantity_sold : 217 < Quantity_sold <= 434
  ○ Q2
▶ Quantity_sold : > 434
  ○ Q4

Close  Save  Save As

FIG. 21C

DATA TREES ASSOCIATED WITH

First « 1 2 3 4 5 » Last

CLASS VARIABLE = windy

```
                    play
           "yes"  /      \  "no"
              outlook    outlook
        "sunny"/ "overcast"\"rainy"   "overcast"/ "rainy"
         TRUE  temperature  FALSE      TRUE    TRUE
              <=75 / \ >75    "sunny"
              TRUE  FALSE     FALSE
```

The Patten String windy(Nom)(C), outlook(Nom), temperature(Num), play(Nom)
Pattern Depth : 11 ; Pattern Repeat : 0
Trimmed Hit Combination.
windy(Nom)(C) , play(Nom),
outlook(Nom) , temperature (Num)
Class attribute is : windy play = yes |
outlook = sunny : TRUE (2/1) |
outlook = overcast || temperature <=
75 : TRUE (2) || temperature > 75 :
FALSE (2) | outlook = rainy : FALSE
(3) play = no | outlook = sunny :
FALSE (3/1) | outlook = overcast :
TRUE (0) | outlook = rainy : TRUE (2)
Level count: 4 Has nominal hit
attribute: true Has numeric hit attribute:
true ]]>

REVERSE INFERENCE windy [TRUE]    [Get Reverse Inference]

| Condition Variable | Pattern Path | Parent Suggesions |
|---|---|---|
| TRUE | play, outlookEQyes,temperatureEQyes, TRUELTEQ75 | play, outlookEQyes |
| TRUE | play, outlookEQyes, TRUEEQsunny | play, outlookEQyes |
| TRUE | play, outlookEQno, TRUEEQovercast | play, outlookEQno |
| TRUE | play, outlookEQno, TRUEEQrainy | play, outlookEQno |

```
       play
        |
    outlookEQyes
        |
   temperatureEQyes
        |
    TRUELTEQ75
```

FIG. 22B

```
C:\shared\DIE\DIE\Island-Resorts-Sales.csv - Notepad++
File   Edit   Search   View   Encoding   Language   Settings   Macro   Run
```

| | |
|---|---|
| CombiGen xsjslib | DB Util xsjslib | DIE_PrajnaaMapperxsjslib | DIEApixsjslib | DIEInvokerxsjslib |

```
 1  Country, Resort, Year, Month, Sales Person, Revenue, GuestNo
 2  France, French Riviera, FY2004, Aug, Fischer, 11111, 733
 3  France, French Riviera, FY2004, Aug, Galagers, 333, 2611
 4  France, French Riviera, FY2004, Aug, Ishimoto, 9800, 2712
 5  France, French Riviera, FY2004, Dec, Galagers, 20000, 1058
 6  France, French Riviera, FY2004, Dec, Ishimoto, 45000, 3515
 7  France, French Riviera, FY2004, Feb, Fischer, 121212, 1976
 8  France, French Riviera, FY2004, Feb, Galagers, 13768, 3380
 9  France, French Riviera, FY2004, Feb, Ishimoto, 23780, 3920
10  France, French Riviera, FY2004, Jun, Galagers, 34512, 3704
11  France, French Riviera, FY2004, Jun, Ishimoto, 83228, 519
12  France, French Riviera, FY2004, Mar, Galagers, 131944, 42012
13  France, French Riviera, FY2004, Mar, Ishimoto, 180660, 1819
14  France, French Riviera, FY2004, May, Fischer, 229376, 4090
15  France, French Riviera, FY2004, May, Galagers, 278092, 3628
16  France, French Riviera, FY2004, May, Ishimoto, 326808, 143
17  France, French Riviera, FY2004, Nov, Fischer, 375524, 447
18  France, French Riviera, FY2004, Nov, Galagers, 424240, 2480
19  France, French Riviera, FY2004, Nov, Ishimoto, 472956, 3084
20  France, French Riviera, FY2004, Sep, Galagers, 521672, 360
21  France, French Riviera, FY2004, Sep, Ishimoto, 570388, 3656
22  France, French Riviera, FY2005, Aug, Fischer, 7680, 682
23  France, French Riviera, FY2005, Aug, Galagers, 9440, 2 545
24  France, French Riviera, FY2005, Aug, Ishimoto, 10400, 3061
25  France, French Riviera, FY2005, Dec, Galagers, 11640, 2767
26  France, French Riviera, FY2005, Dec, Ishimoto, 4680, 2831
27  France, French Riviera, FY2005, Feb, Fischer, 6720, 1388
28  France, French Riviera, FY2005, Feb, Galagers, 9440, 1539
29  France, French Riviera, FY2005, Feb, Ishimoto, 9440, 3661
30  France, French Riviera, FY2005, Jun, Galagers, 13260, 792
31  France, French Riviera, FY2005, Jun, Ishimoto, 13740, 2937
32  France, French Riviera, FY2005, Mar, Galagers, 11610, 2438
33  France, French Riviera, FY2005, Mar, Ishimoto, 11640, 3763
34  France, French Riviera, FY2005, May, Fischer, 6720, 2317
35  France, French Riviera, FY2005, May, Galagers, 9440, 1535
36  France, French Riviera, FY200S, May, Ishimoto, 11800, 4089
37  France, French Riviera, FY2005, Nov, Fischer, 2880, 3416
38  France, French Riviera, FY2005, Nov, Galagers, 9440, 928
39  France, French Riviera, FY2005, Nov, Ishimoto, 4020, 2929
40  France, French Riviera, FY2005, Sep, Galagers, 11640, 4516
41  France, French Riviera, FY2005, Sep, Ishimoto, 13260, 240
42  France, French Riviera, FY2006, Aug, Fischer, 6720, 988
43  France, French Riviera, FY2006, Aug, Galagers, 8260, 693
44  France, French Riviera, FY2006, Aug, Ishimoto, 8260, 4588
```

Normal text file

FIG. 23

```
C:\shared\DIE\DIE\EXPLORER.csv - Notepad++
File  Edit  Search  View  Encoding  Language  Settings  Macro  Run C45Utils.xsjslib | CheckExists.xsjslib | CombiGen.xsjslib | DB_Util.xsjslib | DIE_PrajnaaMapper.xsjslib | DIEApi.xsjslib
 1  MANAGER NAME,MORTGAGE SPECIALIST NAME,LOAN CAT,LINE OF CREDIT,SALES STAGE,CLOSE YEAR,EST. REVENUE
 2  A Scott Wright, William Vong,Auto Loan,Auto Loan, 2PreQualified, 2008, 189360
 3  A Scott Wright, William Vong,Auto Loan,Auto Loan, 4Commited, 2008, 18953
 4  A Scott Wright, William Vong,Auto Loan,Auto Loan, 1Lead, 2008, 191915
 5  A Scott Wright, William Vong,Auto Loan,Auto Loan, 2PreQualified, 2008, 89470
 6  A Scott Wright, William Vong,Auto Loan,Auto Loan, 3Opportunity, 2008, 177559
 7  A Scott Wright, William Vong,Auto Loan,Auto Loan, 4Commited, 2008, 111252
 8  A Scott Wright, William Vong,Auto Loan,Auto Loan, 5Sale, 2008, 114009
 9  A Scott Wright, William Vong,Auto Loan, Auto Loan, 3Opportunity, 2008, 34865
10  A Scott Wright, William Vong,Auto Loan,Auto Loan, 5Sale, 2008, 131327
11  A Scott Wright, William Vong,Auto Loan,Auto Loan, 2PreQualified, 2008, 75697
12  A Scott Wright, William Vong,Auto Loan,Auto Loan, 4Commited, 2008, 28120
13  A Scott Wright, William Vong,Auto Loan,Auto Loan, 2PreQualified, 2009, 8915
14  A Scott Wright, William Vong,Auto Loan,Auto Loan, 4Commited, 2009, 78250
15  A Scott Wright, William Vong,Auto Loan,Auto Loan, 3Opportunit y, 2009, 128652
16  A Scott Wright, William Vong,Credit Card, Visa, 4Commited, 2008, 73425
17  A Scott Wright, William Vong,Credit Card, Visa, 1Lead, 2008, 87196
18  A Scott Wright, William Vong,Credit Card, Visa, 2PreQualified, 2008, 196497
19  A Scott Wright, William Vong,Credit Card, Visa, 3Opportunity, 2008, 194837
20  A Scott Wright, William Vong,Credit Card, Visa, 5Sale , 2008, 33865
21  A Scott Wright, William Vong,Credit Card, Visa, 2PreQualified, 2008, 69413
22  A Scott Wright, William Vong,Credit Card, Visa, 1Lead, 2008, 145958
23  A Scott Wright, William Vong,Credit Card, Visa, 3Opportunity, 2008, 71103
24  A Scott Wright, William Vong,Credit Card, Visa, 4Commited, 2008, 59913
25  A Scott Wright, William Vong,Credit Card, Visa, 2009, 171400
26  A Scott Wright, William Vong,Credit Card, Visa, 3Opportunity, 2009, 155740
27  A Scott Wright, William Vong,Credit Card, Visa, 4Commited, 2009, 26295
28  A Scott Wright, William Vong,Credit Card, Visa, 2PreQualified, 2009, 3487
29  A Scott Wright, William Vong,Home Mortgage, Purchase, 1Lead, 2008, 84217
30  A Scott Wright, William Vong,Home Mortgage, Purchase, 2PreQualified, 2008, 70942
31  A Scott Wright, William Vong,Home Mortgage, Purchase, 3Opportunity, 2008,5996
32  A Scott Wright, William Vong,Home Mortgage, Purchase, 5Sale, 2008, 119584
33  A Scott Wright, William Vong,Home Mortgage, Purchase, 2PreQualified, 2008, 69282
34  A Scott Wright, William Vong,Home Mortgage, Purchase, 4Commited, 2008, 89075
35  A Scott Wright, William Vong,Home Mortgage, Purchase, 1Lead, 2008, 20789
36  A Scott Wright, William Vong,Home Mortgage, Purchase, 3Opportunity, 2008, 172637
37  A Scott Wright, William Vong,Home Mortgage, Purchase, 5Sale, 2008, 107227
38  A Scott Wright, William Vong,Home Mortgage, Purchase, 3Opportunity, 2009, 72509
39  A Scott Wright, William Vong,Home Mortgage, Purchase, 5Sale, 2009, 104782
40  A Scott Wright, William Vong,Home Mortgage, Purchase, 1Lead, 2009, 197704
41  A Scott Wright, William Vong,Home Mortgage, Purchase, 2PreQualified, 2009, 20416
42  A Scott Wright, William Vong,Auto Loan,Auto Loan, 1Lead, 2008, 100495
43  A Scott Wright, William Vong,Auto Loan,Auto Loan, 3Opportunity, 2008, 14683
44  A Scott Wright, William Vong,Auto Loan,Auto Loan, 5Sale , 2008, 1529
Normal text file
```

FIG. 24

AUTOMATIC DETECTION OF PATTERNS AND INFERENCE IN A DATASET

BACKGROUND

Embodiments of the present invention relate to handling of data stored in a database, and in particular to automatic detection of patterns and inference in a dataset.

Unless otherwise indicated herein, the approaches described in this section are not prior art to the claims in this application and are not admitted to be prior art by inclusion in this section.

Today's enterprises store large volumes of data and large data sets. A typical data set may contain billions of rows, each having fifty or more attributes. An enterprise may have hundreds of such data sets.

Existing Business Intelligence (BI) tools for handling such data, may offer certain shortcomings. For example, existing BI tools may call for a user to design reports or visualizations by selecting attributes desired to be analyzed and/or visualized. This is an error prone, trial-and-error approach. It may take days or weeks to understand the data set, and to create the visualization and/or analysis needed by the user.

Moreover, existing BI tools may provide at best a guided navigation interface, and at worst a trial-and-error interface to analyze a particular problem. For example if a user desires to study reasons for low profit, she may be able to identify attribute impacting profitability by trial-and-error only.

Some tools are available allowing users to build statistical models, and to make decisions based on those models. However, because such tools may require specialized knowledge of statistical approaches and methods, they are in general too complex for ordinary business users to utilize by themselves.

In addition, BI tools are moving away from enterprise-wide deployment, to smaller departmental deployments. Such BI tools seek to move control over data and its analysis from the information technology (IT) department, toward business users. This addresses a need to provide analysis and decisions in near-real time.

Accordingly, the present disclosure addresses these and other issues with methods and apparatuses allowing automatic detection of patterns and inference in a dataset.

SUMMARY

One or more techniques may allow automatic identification of statistically significant attribute combinations in a dataset, and provide users with an understanding thereof including starting points for further analysis. In one technique, statistically significant combinations may be obtained from large data sets by limiting combinations to four or fewer attributes. The combinations obtained may be ranked to differentiate patterns, e.g. according to factors such as error ratio, decision tree depth, occurrences, and number of attributes. Still further insights may be achieved by ranking attributes according to the number of statistically significant combinations in which they appear. For useful visualization of statistically significant information within the patterns, only those having at least one measure/numeric may analyzed for further insight (e.g. by an outlier algorithm) and presented as output in a chart (e.g. pie, bar) form. The decision tree approach of various embodiments may facilitate 'What if' analysis of the data, as well as obtaining the reverse inference. Additional techniques are also disclosed.

An embodiment of a computer-implemented method comprises providing a data set comprising data organized in rows and columns, generating a decision tree comprising a combination of between 2-4 columns, and evaluating a statistical significance of the combination of columns The combination of columns is then ranked.

An embodiment of a non-transitory computer readable storage medium embodies a computer program for performing a method. The method comprises providing a data set comprising data organized in rows and columns, generating a decision tree comprising a combination of between 2-4 columns, and evaluating a statistical significance of the combination of columns. The combination of columns is then ranked.

An embodiment of a computer system comprises one or more processors; and a software program executable on said computer system. The software program is configured to provide a data set comprising data organized in rows and columns, generate a decision tree comprising a combination of between 2-4 columns, and evaluate a statistical significance of the combination of columns. The computer program then ranks the combination of columns.

Certain embodiments may further comprise generating an inference based upon a ranked combination of columns comprising at least one numerical measure, and displaying the inference as a chart comprising the numerical measure.

According to some embodiments, wherein ranking the combination of columns considers a factor selected from: a decision tree depth, an error ratio, a number of occurrences, a number of attributes, and a boosting factor.

In particular embodiments, the combinations of columns include a continuous variable, and the method further comprises discretizing the continuous variable.

Various embodiments may further comprise creating a READ ONLY procedure in order to generate the decision tree.

Some embodiments may further comprise, based upon the ranked combination of columns, performing additional analysis selected from ranking of columns, performing a "What if" analysis, and obtaining a reverse inference.

The following detailed description and accompanying drawings provide a better understanding of the nature and advantages of particular embodiments.

BRIEF DESCRIPTION OF THE DRAWINGS

FIG. 2 is a snap shot of the data of Food Mart Sales dataset.

FIG. 3A shows an algorithm for generating the combination.

FIG. 3B shows a Java script implementation.

FIG. 4 shows pseudo code for creating sql on top of 1 function.

FIGS. 5A-C show pseudo code.

FIG. 7 shows implementation in java script.

FIG. 8 shows pseudo code.

FIG. 9 shows implementation in Java script.

FIG. 11A shows implementation in Java script.

FIG. 11B is pseudo code of read only stored procedure.

FIG. 11C shows a snap shot of control master.

FIG. 12A Pre-Process Information:

FIG. 12B shows a tree model.

FIG. 13A shows a table structure.

FIG. 13B gives an example.

FIG. 13C shows a JSON Tree Structure.

FIG. 13D shows an implementation in Java script.

FIG. 13E shows more examples of DT model strings.

FIG. 13F shows pre processing information.

FIG. 13G is a representation of models in the pictorial tree format.

FIG. 13H shows pre processing information.

FIG. 13I shows a decision tree.

FIG. 13J shows a tree representation.

FIG. 15 Pseudo Code to calculate the depth.

FIG. 16 shows pseudo code.

FIGS. 17A-B show tree structures.

FIG. 18A shows pseudo code for overall rank calculation.

FIG. 18B shows pseudo code of r rank table.

FIG. 18C shows an example for snapshot of content.

FIG. 19 shows pseudo code.

FIG. 20A java script implementation to generate tuple from given set of columns present in the DIE pattern.

FIGS. 21A-C are screen shots.

FIGS. 22A-B are screen shots.

DETAILED DESCRIPTION

Figure 1:
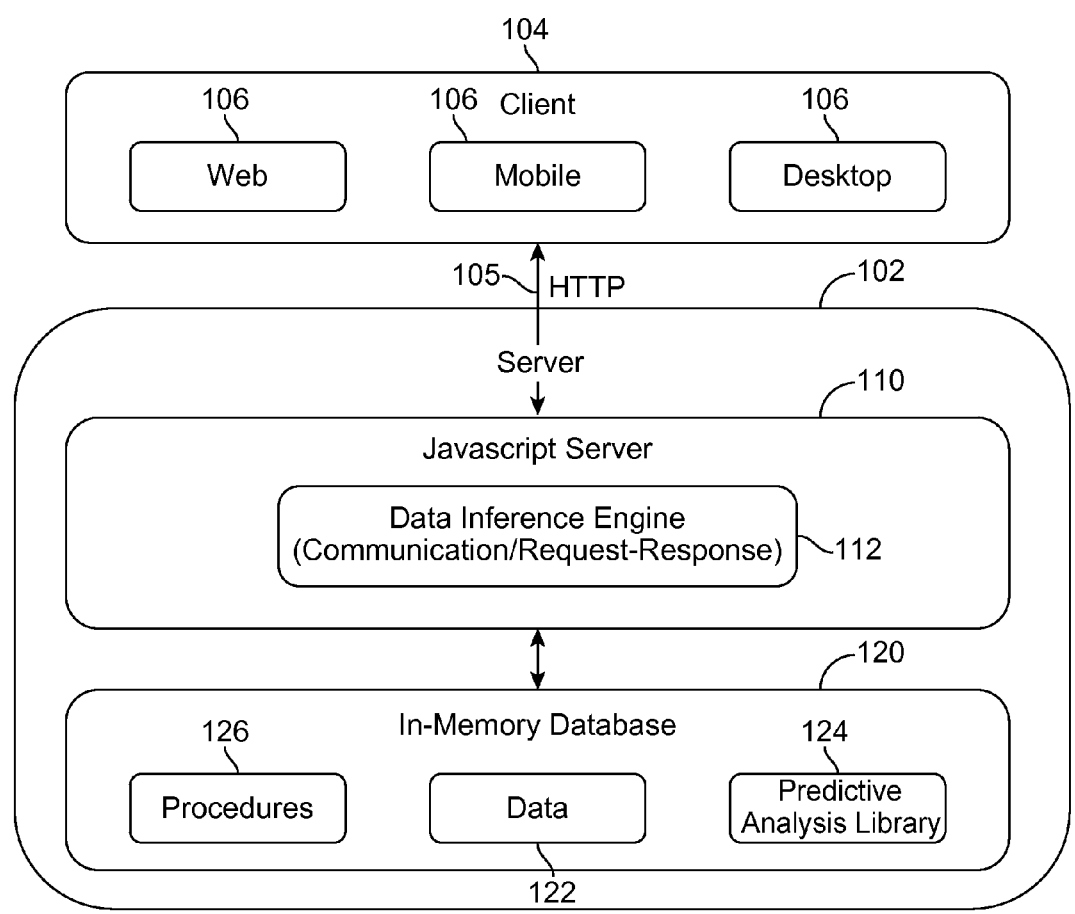
FIG. 1 shows a simplified view of a system according to an embodiment.

Described herein are techniques for automatic detection of patterns and inference in a dataset. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Business decision makers make decisions to reach their business goals from data through different BI tools. These decision makers depend on data which can run into trillions of records and hundreds of columns.

In the process of arriving at decisions working with such large data volumes, decision makers seek to understand the extent to which factors of the available data influence the key factors or goals. Business decisions involve risk, and hence decision makers spend a significant time on decision making.

Examples of business use cases can include one or more of the following. As an example only, these use cases are described from the perspective of a high level executive in the business of selling food. Specifically, FIG. 2 shows a snap shot of exemplary data of a Food Mart sales dataset, that is stored in a database.

In particular, the high level executive may be confronted with the task of determining for a given particular brand, what is the best location to sell. This is a problem because there are tens of factors associated to take any decision. But currently, I have two factors to work out. I have to identify a particular location for a given brand by knowing where is that best selling location. But looking and working with other tens of factors and deriving a conclusion is difficult.

As a high level executive, I will need to know what can be the target for a given brand in a particular location. Also, what could be the possibility of getting the new customers of a particular income group? It is a problem for me as on identifying a particular location, I will need to how can I expand the customer base in the given particular location. Again, though there are number of influential factors, I would like to what could be the best possible ways by working with these factors.

As a high level executive, I will not be interested in all the factors/information available in the data. Here in my food mart sales there are factors which are never attributed to any my decision. I don't want to deal with all those unnecessary and not significant attributes all the time. So I would like to know what are the significant factors/information in the given information so that I can always work with real and relevant data.

As a high level executive, I will need to aware what are the best decisions that I can take on the given information. I want to know all the possible and feasible solutions/decisions that I can take in given data. Also, along with possible and feasible, I should be aware about the best possible solutions and decisions that I can take in the given data.

As a high level executive, I always need to know that what are the most influential factors on the given information. I want to know what is most influential. I often get situations where I can reach my target by modifying either one of the two factors. But I want to know which of them has most influential in both positive way and negative as an overall to my business and want to make the proper decision. I don't have any tool to rely on this.

As a high level executive, I often get target in hand and I always need to make sure in altering all other influential factors such that I can reach the target. Say for example, I get target I need to reduce the overall cost of the company by 2%. Now, I need to know what are the factors contributing to overall cost of the company. Also, I want to know how can I work with other factors such that my overall cost gets reduced by 2% and I reach the target. This is a day-to-day problem that I have and which may not be addressed by any tool.

As a high level executive, I need to take decisions quickly, without waiting too long the current competitive environment. Also, I need to work with real data.

Conventionally, whenever a high level executive sought to make decisions as outlined above, they contacted business analysts. Typically, such business analysts analyzed the market with given input and conditions, and came up with a limited number of suggestions.

In the above use cases what would have typically happened was: the C-level executive would have called a business analyst. Securing the availability of the business analyst and arranging a meeting would have taken time. In the meeting, the executive would explain the requirement of increasing the revenue by 2 percent with the information in his possession. The business analyst would need to go through the data carefully with the requirement in hand, and would have come up with couple of alternative decisions for the executive, over a month or more timeframe.

So, a likely turnaround time for obtaining these possible solutions would have been months. And by the time of getting possible solutions, the market conditions may have changed and the viability of the proposed decision itself could be affected. This is a typical scenario encountered by many business people.

Accordingly, embodiments relate to a smart utility that can be used to find out associated attributes for a given attribute. Whenever a decision to modify an attribute is taken, embodiments provide information regarding the impact of the change.

Embodiments may provide associated attributes for a given attribute, and provide visibility as to decision factors for changing in the given attribute. Thus, embodiments provide a user with patterns extant within a dataset, and can be used to obtain statistically significant attributes for a given attribute.

FIG. 1 shows a simplified view of a system according to an embodiment. In particular, FIG. 1 shows a system 100 comprising a server 102 that is in communication with a client 104 via an HTTP connection 105 through one or more interfaces 106 (e.g. web-based, mobile-based, desktop).

FIG. 1 shows the server as comprising an application server 110. In this particular embodiment, the application server comprises a Javascript server, and includes a data inference engine (DIE) component 112.

The system further comprises an in-memory database 120. Stored within that database are data and corresponding meta data 122. The data may be organized in the form of rows and columns, with columns corresponding to particular attributes. The meta data may comprise information such as column names, data types, and dimensions/measures.

Also stored within the database is a Predictive Analysis Library (PAL) 124. The PAL contains instructions for performing various data mining activities, including but not limited to outlier detection, decision tree, a-priori, and others.

Further stored within the database, are procedures 126 which may be implemented to recognize patterns within the data. As discussed in detail below, this may be done by first generating combinations of columns, and then ranking those combinations. Performing pattern generation by scripts (e.g. L scripts) stored at the data base level, can help to improve performance and reduce costs associated with analysis.

Figure 1A:
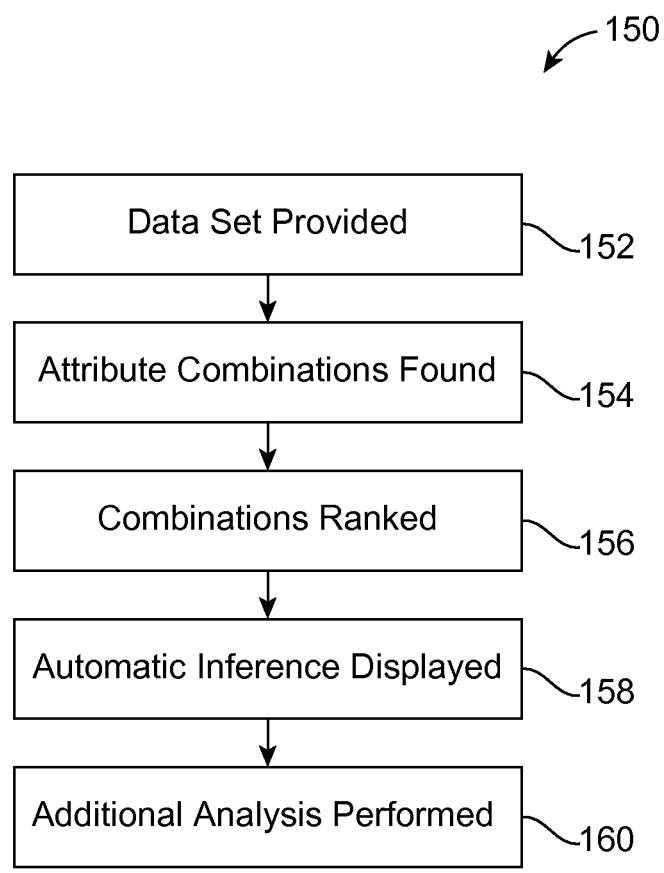
FIG. 1A shows a simplified process flow according to an embodiment.

Specifically, FIG. 1A is a simplified flow diagram of a process 150 according to an embodiment. In a first step 152, a data set comprising data stored in rows and columns is provided.

In a second step 154, statistically meaningful combinations between various columns within the data are found. These combinations may be expressed in the form of a decision tree.

In a third step 156, the combinations may be ranked according to various factors. Examples of factors include but are not limited to a decision tree depth and/or a decision tree size, as is discussed in detail below.

In a fourth step 158, one or more of the ranked combinations may be displayed to a user as part of an automatic inference. Such display may be in the form of a pie chart/bar chart etc. showing a nature of the correlation between the different attributes.

Based upon the combinations and automatic inferences drawn therefrom, additional data analysis 160 may be performed. For example the combinations can serve as the basis for generating meaningful insights into the data, utilizing data mining algorithms such as outlier detection. As is discussed in detail below, meaningful insights may be obtained in the basis of "What if" analysis on the combinations, and/or obtaining of reverse inferences from the combinations.

Providing systems and methods allowing automatic detection of patterns and providing inferences, in a dataset may face one or more technical challenges. A summary of thirteen (13) specific technical challenges are now listed below, together with approaches for addressing them.

(1) Finding Combinations in a Dataset. One challenge is to find combinations of columns in the given dataset. As described in detail below, this may be addressed by limiting combinations to four or fewer attributes.

(2) Use of PAL. Another challenge is the use of Predictive Algorithm Library (PAL) PAL/L Scripts. A PAL function may be written by HANA script which is in L script. But L Script does not support dynamic column names and types. As described in detail below, based on the combination and data types, this may be addressed by pre-calculating the possible stored procedures with the hard coded column names like column1, column2 etc. While invoking these functions, we will use hard coded column names and after the invocation we will replace it back to the original name.

(3) Application Server/Background Task. Still another possible challenge is to take into consideration of an application server which does not support the background task. We have innovated generating the chunk by chunk DIE, such that that whenever client interested in DIE patterns for a given dataset, until the back ground processing client keeps sending the request and DIE will keep generating chunk by chunk patterns. It stores the information for how many already generated and it generated the DIE for next set of 'N' patterns until the complete DIE for a given dataset (4) Random Sampling. In-memory real time data may have millions of rows. Sampling of the data may be achieved by implementing random number generation capability of L script language that is not available in SQL.

(5) Discretization of Continuous Variables. The PAL DT does not have the ability of discretization the continuous variable. In order to discretize the continuous variable and pass it to PAL as ranges, equal frequency discretization divides the range of possible values into N bins, each of which holds the same number of training instances.

(6) Creation of READ ONLY SQL Procedure. In order to make the procedure as read only procedure and inserting the control master from App Server context, a stored procedure is created in the application server context. Also, we shall directly insert the values to control table directly from app server with some ID which is used in the procedure that is getting constructed. So, by the time the procedure execution it will have the values in the control master and DT creation will refer the control master while it is getting executed.

(7) Parsing the Output of PAL. An efficient parsing logic for PAL output is introduced. We shall form a JSON structure which has the complete and self sufficient information about the tree structure.

(8) Ranking the Generated Patterns. It is possible to get thousands of patterns from the DIE. To differentiate the patterns, ranking is employed utilizing factors such as error ratio, depth, occurrences, and number of attributes taking part. A boosting factor may be used.

(9) Generating Meaningful Insights from Statistically Meaningful Combinations. In order to enhance efficiency and reduce processing time, insight generation algorithms (e.g. outlier algorithms) are run only on statistically significant combinations as revealed by the ranking process.

(10) Ranking Attributes. Still further insights into the data may be achieved by ranking attributes according to the number of statistically significant combinations in which they appear.

(11) Automatic Inference. To visualize statistical significant information in a dataset in a useful way to the user, out of the statistically significant patterns, only those having at least one measure/numeric will be analyzed for insight and presented as output in a chart (e.g. pie, bar) form.

(12) 'What if' Analysis. As described in detail below, the use of a decision tree approach allows the performance of 'What if' analysis on the stored data.

(13) Reverse Inference. As is also described in detail below, the use of a decision tree approach also allows the performance of the reverse inference for analysis.

We turn now to address each of these challenges in detail. Certain of the following sections may specifically refer to pattern recognition and inference generation in data stored in the HANA® in memory database available from SAP AG® of Walldorf, Germany. However, such embodiments are not limited to this particular database, and may be useful in connection with others. Such other databases include but are not limited to the SYBASE IQ® database also available from SAP®, the Microsoft® Embedded SQL for C (ESQL/C®) database available from Microsoft Corp. ® of Redmond, Washington, and the Exalytics® In-Memory database available from Oracle Corp.® of Redwood Shores, California.

(1) Finding Combinations in a Dataset. As described above, a first task performed by methods and apparatuses according to embodiments, is to determine the combinations in given dataset. This is done because otherwise it will be difficult to find out the different patterns.

If we provide the whole set of data and set of columns and get only one pattern, it will be difficult to determine the accuracy of the pattern. Instead, embodiments identify several patterns in the given dataset by focusing on a limited number of columns. This allows several patterns to be determined which can then be ranked to provide a best pattern present in the given dataset.

Certain embodiments find out the different combinations by heuristically determining that out of all the given columns in the given datasets, we start generating the combinations starting from nc4. We have heuristically determined that only up to nc4 combinations from nc2 will give a favorable result. Combinations probably having more than four attributes in the decision factors, tend not to yield as good results. Accordingly, embodiments generate nc2, nc3 and nc4 combination in the given dataset's column.

FIG. 3A shows an example of an algorithm configured to generate a column combination according to an embodiment. FIG. 3B shows Java script implementation of this algorithm.

Combinations may be found for given set of columns of a given dataset. Columns used for generating and to find out various possible combinations.

In certain embodiments, the NcR mathematical formula is used to find out the combinations. Statistical significance of a combination is determined once the combination is generated and the algorithms are run, because there is no way to find out the statistical significance at the start time.

The criteria for finding out statistical significance are to determine the columns that participate in the decisions. For example, there is a combination of columns (e.g. 'sales revenue', 'store place', 'product') and if we identify from our analysis that it is only 'store place' which derives the 'sales revenue', then these two columns are statistically significant in the given combination. That is, the value of 'product' will never influence the decision based on these three columns (2) Use of PAL. Another issue arises from use of PAL function written by HANA script, which is in L script. However, L Script does not support dynamic column names and types.

An approach may use an algorithm implemented in L script as it needs looping and it needs to generate the tree. However, L script needs the column name, and type should be strongly type defined. This indicates that when an L script accepts the data set as the argument, it expects the data set to be defined such that variable names and types match the input.

Thus in an example, if it is sought to implement L script for obtaining an inference for a table which has the column ID, Region, SalesPeriod, Revenue, and CLASS, then the L Script can be written as outlined in Figures C and D. In particular, FIG. 4 shows Pseudo code for creating sql on top of lfunction.

Now it may be desired to use the same L Script for the different set of arguments even with the same attributes. That is, if it is desired to use L procedure created for above attributes (e.g. for Revenue and Region), then this is not supported as it expects arguments in the same order as created.

This issue may be exacerbated in that embodiments may run on thousands of combinations, and it needs to generate some thousand stored procedures for invoking DT functions. This can be problematic as creating every new procedure can negatively affect the performance.

Also, it can negatively impact the optimal resource utilization. For example in a dataset having 26 columns, the number of combinations would go up to 65,000. Creating 65,000 stored procedures, tables, etc. is a costly operation from performance and resource utilization standpoints.

Accordingly, based on the combination and data types, embodiments pre-calculate possible stored procedures with the hard coded column names like column1, column2 etc. While invoking these functions we will use hard coded column names, and after the invocation we will replace it back to the original name.

As described below, this approach can be extended to any number of combinations. For explanation, however, here we shall explain its implementation for the nc2 to nc4.

According to this approach, whatever the number of combinations; we know the data types are pre-defined as either STRING or DOUBLE. Everything else can be type casted to either STRING or DOUBLE-data types like tiny int, integer, float etc can be type casted to DOUBLE and other set of data types like VARCHAR/NVARCHAR etc can be type casted to STRING.

With this in mind, we consider the scenario of nc2. Here, the possible combinations from the data type perspectives are: DOUBLE, STRING or STRING, DOUBLE.

Similarly, for the given nc3 combination there would be 2*2*2 combinations:
1] DOUBLE, DOUBLE, DOUBLE;
2] STRING, DOUBLE, DOUBLE;
3] DOUBLE, STRING, DOUBLE;
4] STRING, STRING, DOUBLE,
5] STRING, STRING, STRING
6] DOUBLE, DOUBLE, STRING,
7] STRING, DOUBLE, STRING,
8] DOUBLE, STRING, STRING.

This can be done for nc4 as well (e.g. [DOUBLE, DOUBLE,DOUBLE,STRING]). This approach can be extended to any number of combinations, as the combinations are compile-time behavior and not run-time behavior.

Combinations can be identified during the compile time. On identifying these combinations at compile-time, column names are addressed.

For L script, column names are to be strongly type defined. One approach is to create L scripts/procedures dynamically, which can affect performance. Here however, once we identify the supported data types, we will create the L scripts for pre-defined column names.

Then, for use with given input, the following technique is used. Before invoking the pre-created L scripts, the column names are changed to pre-determined column names.

For use back, the system knows the mapping between real names of the attribute and the predetermined name. Thus upon receiving the output, we shall map it back to the real names of the columns. This simple but powerful solution addresses issues relating to performance and resource utilization.

FIG. 5A shows the pseudo code of having pre created L script for [DOUBLE, DOUBLE, DOUBLE, STRING] combination. This L script would be created during the compile time.

FIG. 5B shows Pseudo Code to replace the predefined hard coded COLUMN Names from the actual column name. Figure D3 shows pseudo code to replace back it to original column names This approach increases performance while maintaining resource utilization at a low level. Unlike an approach having to dynamically create many thousands (e.g. 65,000) of stored procedures and tables, embodiments this solution achieves the same solution with just fourteen (14) stored procedure and data types created at compile time.

(3) Application Server/Background Task. As mentioned above, another issue that can arise is to support running on an application server, which does not support the background task. Creation of DT is an NP Complete problem. It may be high cost, with the real scenario data which has many columns. When it is run on the application server, the client may be timed-out owing to time consumed in generating the DT.

Embodiments may comprise an application deployed in a manner that avoids this issue. For example, in connection with the HANA® in-memory database available from SAP® AG of Walldorf, Germany, the application may be deployed on top of the XS Engine®.

The XS Engine is an optional component HANA that provides a consumption model exposed via HTTP. The XS programming model provides a way to map the database model comprising tables, views, and stored procedures, to the consumption model. This mapping can be done in a declarative way, or by writing application specific code that runs in the XS Engine.

Application code for the XS Engine may be written to provide the consumption layer for client applications. Data-intensive calculations are performed closer to the data, in the database process hosting the data. SQL Script, modeled views, L procedures, or even C++ may be used. The application logic running in the XS Engine does not perform performance-critical tasks, but invokes views and stored procedures.

XS Engine may not support back ground tasks as such. Whenever there is a request the XS Engine spawns a thread for the request, and that same thread bears the responsibility of returning back the response. That is, the XS Engine will not allow applications to create the background task.

It may also be understood that automatic inference and pattern detection cannot be run indefinitely because clients will time out. Also from the user point of view, it is frustrating to experience an operation taking too long until it gets timed out. However, the user needs the information of automatic patterns and inference detection in the given dataset.

In the course of investigation, it has been recognized identified that generating DTs for first 'NT' (N being 100-200) combinations, is of equal proportion. Accordingly, embodiments generating the chunk-by-chunk data inference engine (DIE).

Thus whenever a client is interested in DIE patterns for a given dataset, until the background processing client keeps sending the request and DIE will keep generating chunk by chunk patterns. As mentioned, the generation of DIE is costly operation. In a given dataset, there could be thousands of given combinations and generating DIE for all given combinations could be time consuming. In a typical scenario, client would even be logged out of the system.

To avoid this scenario, the back end involves the client as well. So, the client keeps sending the request, and DIE is generated chunk by chunk.

Here, the client will not be aware of the size of total DIE combinations. The client keeps pinging to back end, until it gets a result is received from the back end that no more DIE generation is pending.

That is, embodiments store the information regarding how many were already generated. Embodiments generate the DIE for next set of 'N' patterns, until the complete DIE for a given dataset is generated.

Three factors have impact on the performance of create DT function: number of rows; number of columns; and data distribution (the complexity of the tree model generated). Computation complexity of create DT roughly is $O(N^2 \cdot M)$, where N is the number of columns and M is the number of rows. For 200 k rows and 40 attributes, the time cost is about 40 seconds in the experimental scenario.

Figure 6:
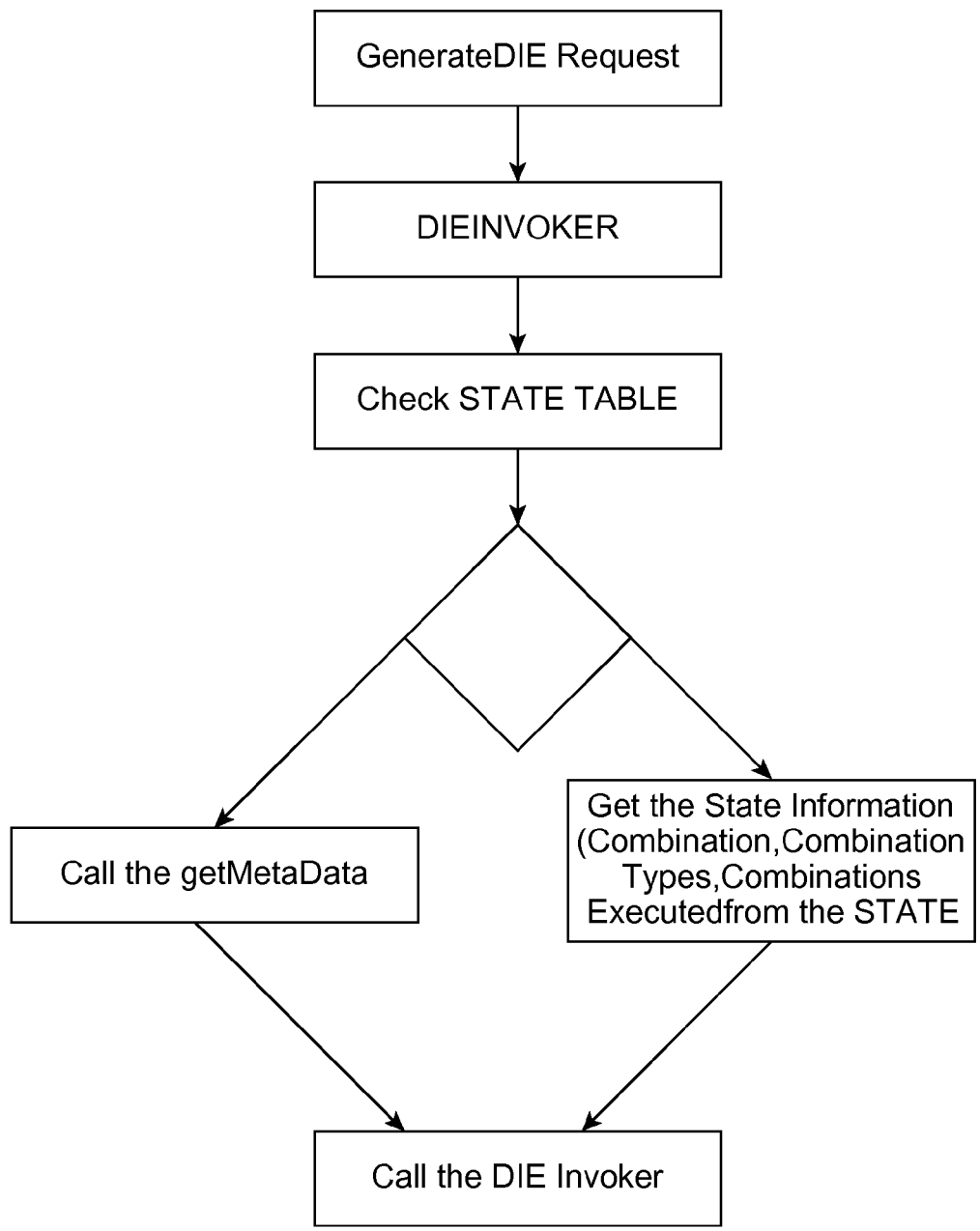
FIG. 6 shows a simplified process flow.

FIG. 6 shows a simplified process flow according to an embodiment. FIG. 7 shows an embodiment implemented in java script:

When there is request to generate DIE on a given dataset, embodiments determine whether any of the DIE has been generated for the requested dataset. If the entry is not there, then it means that DIE has not started generating for the given dataset.

Accordingly, embodiments generate the entire set of combinations and we shall keep the state. Then we will start generating DIE for first chunk.

Once it is successful, the chunk details are saved in State table. In a particular embodiment the size of chunk is 100, which can be changed.

Embodiments then return back the details. If the client is further interested, the client will again request for the next chunk. This time the state table will have the details of the requested dataset, and also it has the information on the size of chunk successfully generated.

So, embodiments start generating from that given chunk. This process goes on until the client is interested, or to address the combinations from a given dataset.

(4) Random Sampling. As mentioned above, in real time in memory data may have millions of rows. It has been heuristically determined that sampled 1000 records of the given dataset will be really equal to the DT that comes from millions of rows of the data. However, we don't have the random function in the SQL.

Investigation has indicated that considering all of the (millions) of rows of data for determining a DT, may not be necessary. Specifically, it has been determined that randomly sampled 10-20 times rows of number of columns will yield a best result/DT.

For implementing this at the back end, a problem was there is no random function at SQL. If we don't sample, the decision tree algorithm will run on the entire data set, taking a long time to generate useful patterns.

Accordingly, embodiments implement the random function in the L language. The L language provides a random function which returns a random number in between 0 to 1. So, we have multiplied that number with the number of records in the given dataset, to get the range between zero and the size of the records.

This is continued until the number of records needed is met. Though it has been determined that ~20× a number of rows and columns is enough to identify the proper pattern in the given dataset, in certain embodiments this can be limited to a predetermined number (e.g. 1000).

FIG. 8 shows Pseudo Code according to an embodiment. Until the counter becomes loop size we will generate pseudo random number, and that will be multiplied by number of rows. This step converts the number from 0-1-0 in order to size of dataset being passed. On achieving the right index, we shall consider the row present in the index.

So, we will have one simple L script and sampled data for given table. We shall invoke the DIE for the sampled data. So with the very better performance (e.g. 30%) increase we shall get the same quality result/output from DIE.

(5) Discretization of Continuous Variables. As mentioned above, another issue that arises is discretization of continuous variables for the DT creation algorithms. Specifically, the PAL DT does not have the ability of discretizating the continuous variable.

Accordingly, embodiments shall discretize the continuous variable and pass it to PAL as ranges. In considering this scenario, frequency-based distribution may be a desirable approach. It treats that every continuous variable as a discrete value if we don't discrete the continuous value. As numeric is bound to flow across thousands of values, if they are not discretized the pattern may be unreadable and not feasible for decision-making.

Consider a dataset which has product and sales revenue. Here Sales Revenue is a continuous value, and not every entry is discrete like Product. The example data may be seen in the following table:

| Product | Sales Revenue | City |
|---------|---------------|------|
| A | 50,000 | Bangalore |
| B | 60,000 | Shanghai |
| C | 70,000 | San Francisco |
| D | 51,000 | Bangalore |

A, B, and C (which are Product names) are discrete values. But, Sales Revenue is not a discrete value but it is a continuous variable.

Here we should be specifying the ranges for the Sales Revenue. If we specify the ranges as 60,000, then the outcome would look like:
 if Sales Revenue is less than 55,000, then irrespective of the Product it is always sold in Bangalore.
 If Sales Revenue is greater than 55,000, then City is considered:
 if Sales Revenue is more than 55,000 and Product is B, then it is sold in Shanghai;
 if the Product is C, then the City to be targeted is San Francisco.

To provide the ranges, embodiments may employ equal-frequency discretization. FIG. 9 shows an embodiment implemented in Java script.

Equal-frequency (or equal-height) binning divides the range of possible values into N bins, each of which holds the same number of training instances. For example, consider 10 training examples with the following values for the attribute being discretized: 5, 7, 12, 35, 65, 82, 84, 88, 90, 95.

To create 5 bins, we would divide up the range of values so that each bin holds 2 of the training examples: 5, 7, 12, 35, 65, 82, 84, 88, 90, and 95. To select the boundary values for the bins, this method typically chooses a value halfway between the training examples on either side of the boundary. Examples are thus:

$$(7+12)/2=9.5 (35+65)/2=50$$

Figure 10:
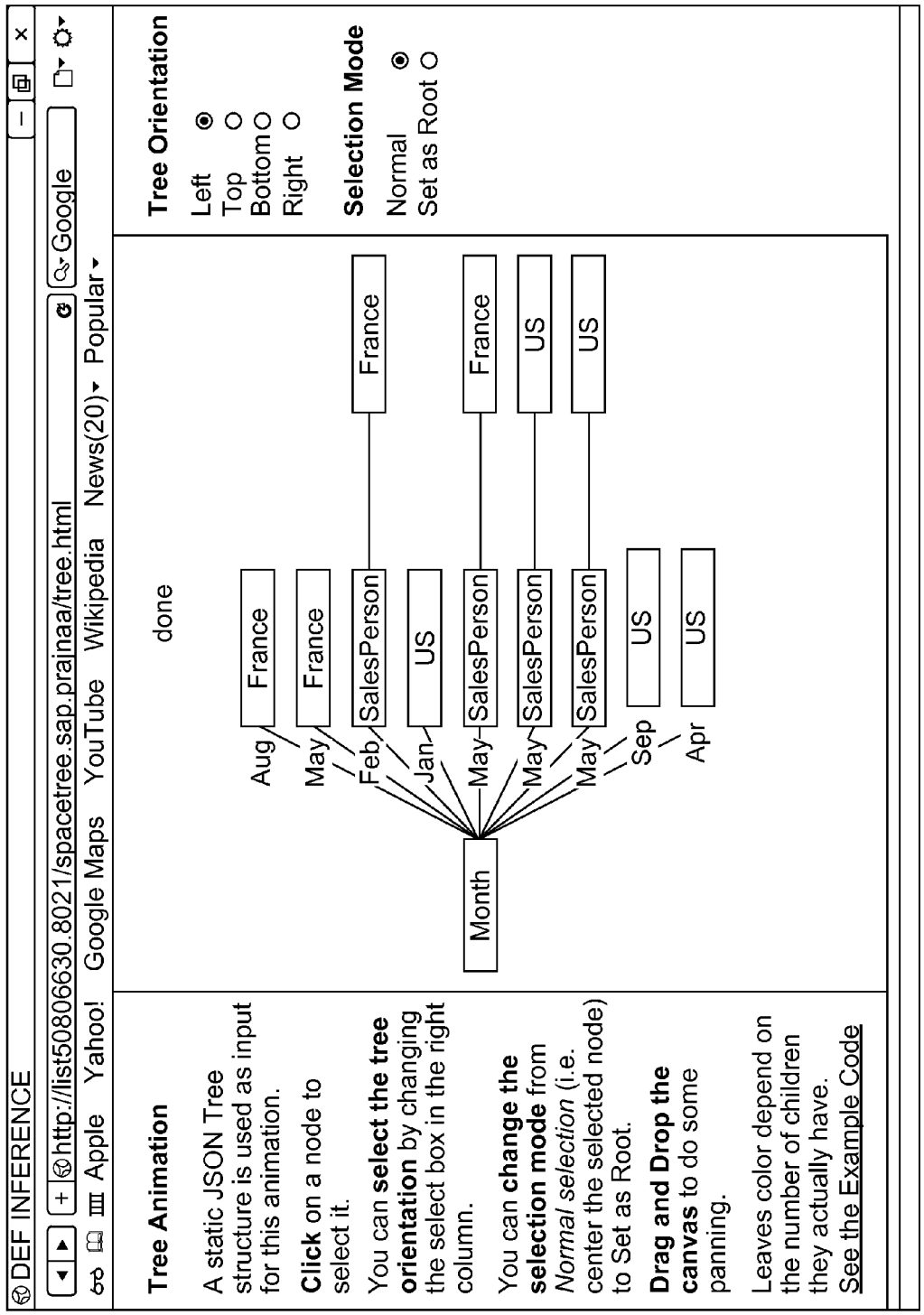
FIG. 10 shows a screen shot.
Figure 23:
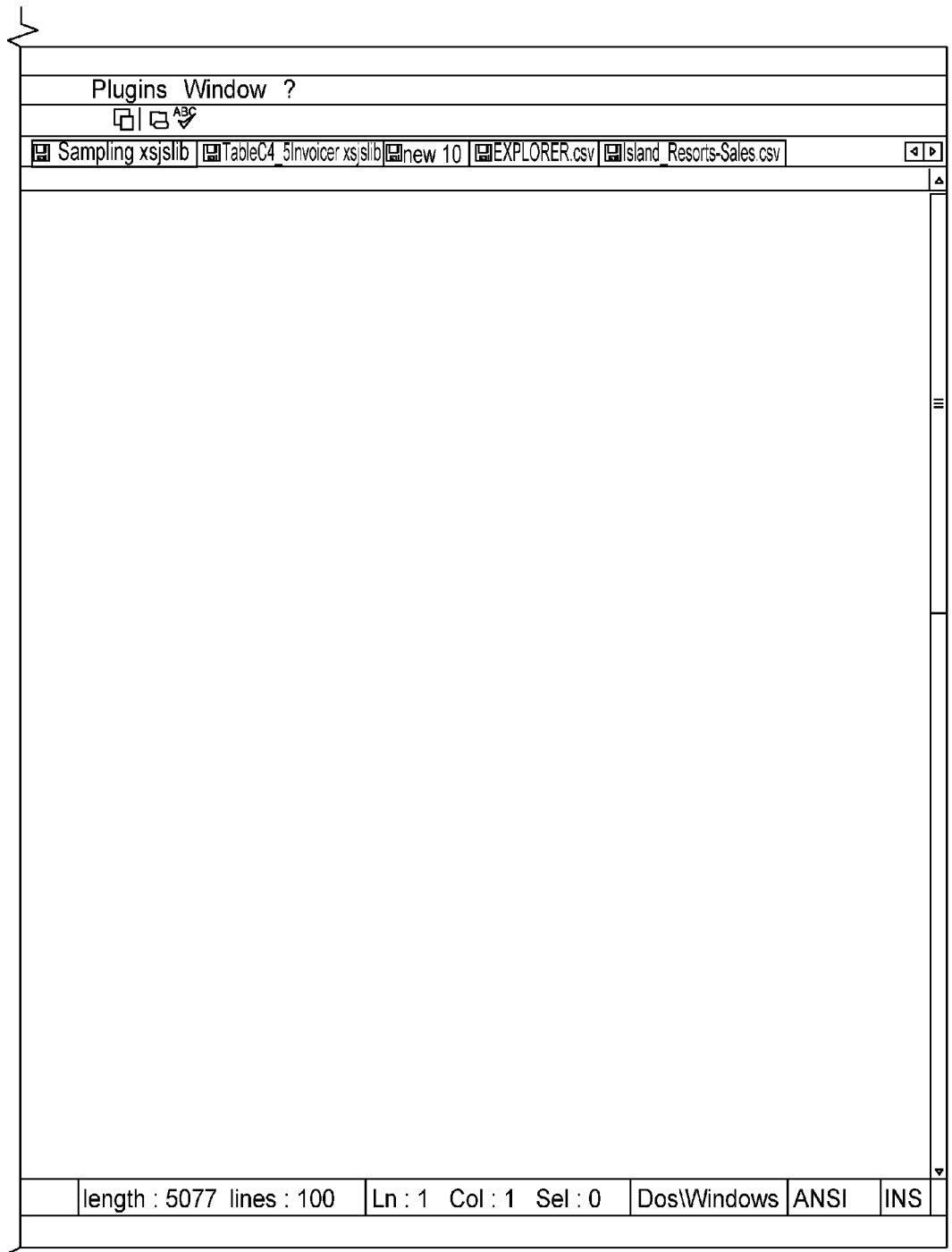
FIG. 23 show IceLand Resorts Data.
Figure 24:
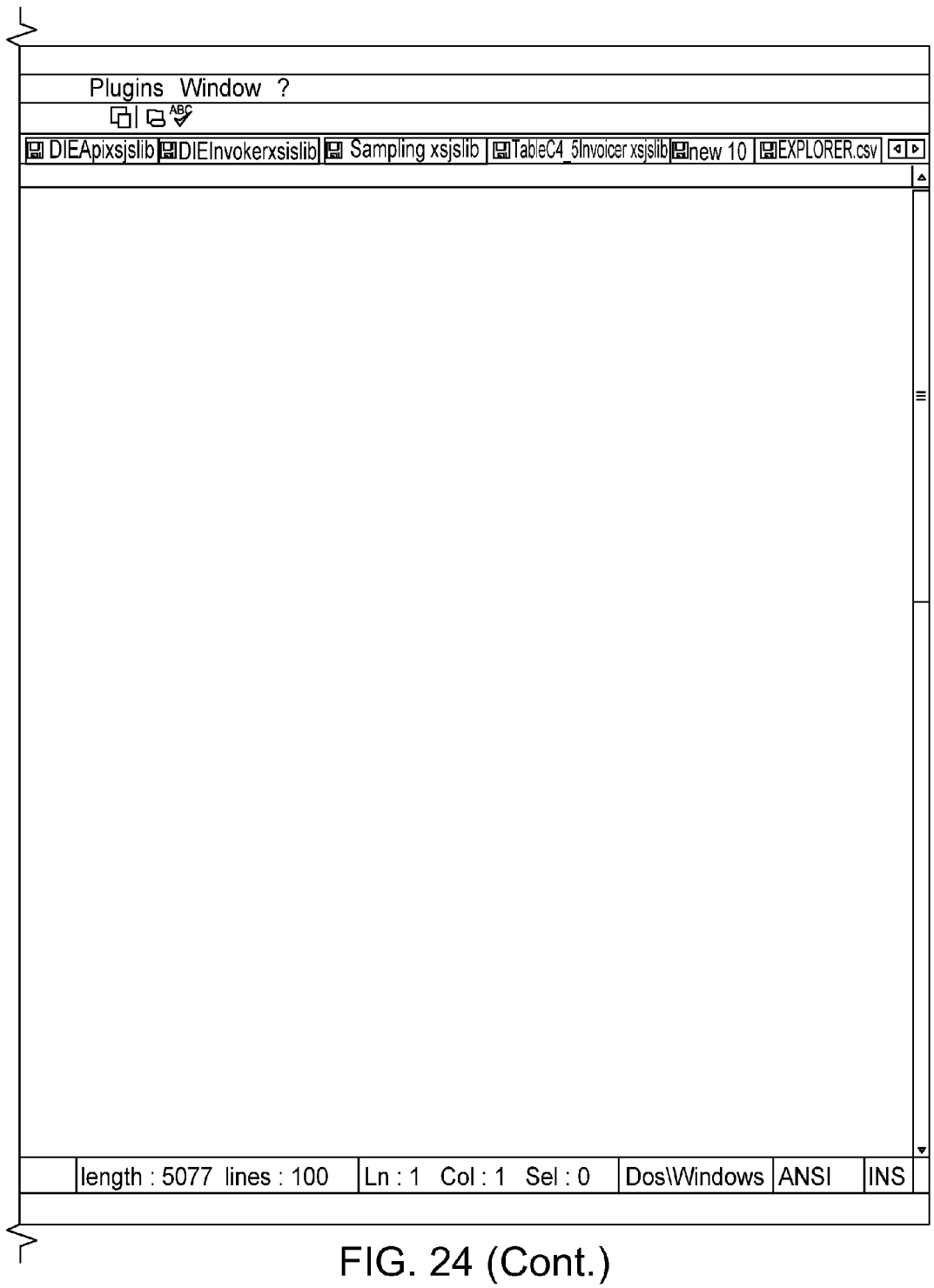
FIG. 24 Explorer Data used as example datasets.

Remaining issues addressed in this document reference the concept of a decision tree. FIG. 10 represents a DT for the columns: Month, Country, and sales person, taken from the Iceland-resorts data shown in FIG. 23.

One decision that can be arrived by this tree, is:
 if the month is August, then people always visit resorts in France.
 Another decision that can be arrived by this tree, is:
 it is only in the months February/March/May where the sales person is statistically significant with month and country.

Otherwise, the sales person does not have a role (that is, the sales person is statistically insignificant).

As mentioned previously, embodiments may be implemented on top of the HANA in-memory database. HANA comes with Predictive Algorithm Libraries (PAL). DIE uses C4.5 implemented by PAL.

(6) Creation of READ ONLY SQL Procedure. One issue addressed by particular embodiments is to create a READ ONLY SQL Procedure for executing the PAL invocation procedures. Specifically, creating DT can be a high cost operation. Also, embodiments may run the DT creation algorithm for several thousand combinations.

Accordingly, embodiments increase performance of the master procedure to obtain the DT result as early as possible. We can start with making the PAL Procedure as Read Only.

If we don't make the SQL Master Procedure Read Only, then the execution of all the thousands of SQL Statements will be sequential. If sequential, then it takes more time than if Read Only which enables parallelization capability of HANA.

However, a Read Only procedure may not have insert statements. Executions of PAL create DT functions calling for some control information to be in the control table before invocation.

This control information would be only available at run time. But if we insert the information to control master in the master procedure, we can't make use of HANA's strength of parallelization.

Accordingly, embodiments resolve this issue by making the procedure Read Only, and inserting the control master from the application server context. FIG. 11A shows an embodiment implemented in Java script. FIG. 11B shows pseudo code of Read Only stored procedure according to an embodiment. FIG. 11C shows a snap shot of a control master according to an embodiment.

In particular, the stored procedure is created in the application server context. Also, the values are directly inserted to the control table directly from the application server with an ID used in the procedure being constructed.

Accordingly, by the time of procedure execution it will have the values in the control master, and DT creation will refer the control master while it is being executed. In this way parallelization is achieved and performance maintained.

In the application server context, embodiments may build the master stored procedure that is executed later. While building the procedure, we will have the information about the metadata of columns used for that combination. Also while building the procedure, in the application server the control master and Meta data information may be inserted directly into control master table.

After directly inserting the content to control master, we build the stored procedure to allow it to obtain the control information for PAL from the control master with the unique ID. That is, while we are putting the value to the control master, we shall put the combination ID. And, we are using the same combination ID while getting the control information for that particular combination. This makes parallelization achievable in the stored procedure.

(7) Parsing the Output of PAL. With reference again specifically to HANA, yet another issue that may arise is to parse the output of PAL in accordance with adjacency list representation. Specifically, the output of PAL will be two rows in the out table.

One row is the pre processing information. Another row is the actual data structure which has the reference back to pre processing information.

In order to implement certain embodiments, the decision trees will be written/visualized from those outputs. But, pre processing information will have the complete Meta data, and the model data has the tree structure.

So every time the tree is to be written, we have to repeatedly parse the pre processing information as well, a costly operation. Also, the structure is not readily visually represented for consumption.

Specifically, FIGS. 12A-12B are representation of PAL output. In particular FIG. 12A shows Pre-Process Information, and FIG. 12B shows a Tree Model. The information present in FIGS. 12A-12B is not easily recognized.

Accordingly, embodiments introduce an efficient parsing logic for PAL output. On receiving the output from the PAL, we do the parsing. We form a JSON structure having complete and self sufficient information about the tree structure.

Embodiments do not need to refer the pre processing information in order to use the DT. Every node is self sufficient, specifying number of children, condition, and parent index and child number.

The root node represented as −1. All other nodes will have the index of the JSON object in the array.

For example, FIG. 13A shows the Table structure, and FIG. 13B shows the pseudo code. The second element is the child of the first element (TEMPERATURE) when the condition is temperature is <65.

Unlike the above example where we have to refer back to two rows always, here it is always one pass with all information. Moreover, every element in the JSON array can be directly mapped to a row in the table—pseudo code.

We can have (self) join to get the whole tree/only leaves and just one path as well. But adjacency is not the best when we have to delete the nodes from the tree. As we don't have that kind of use cases, we had chosen the adjacency list representation. But the challenge was to get the output of c4.5 converting it to adjacency list representation. That was the key thing/differentiator from the above solution. Because from the output of PAL which has multiple rows and preprocessing information, we shall derive 1 row per condition with complete data—for example shown in the FIG. 13B.

Here we will be having:

| Id | NodeName | ParentId | Condition |
|----|----------|----------|-----------|
| 1 | TEMPERATURE | 1 | 1 |
| 2 | Yes | 1 | <65 |

Here it represents in the tree that if temperature is less than 65, then the node name is Yes.

Also, we will be having DIE_TO_CONDITION mapping where we map every rank table entries into the condition. So it helps us that given a pattern/DIE_RANK table entry, we shall get the information on what the tree looks like from this table.

The approach just described can be used to represent the trees in UI/text/HTML5 etc. It also makes it easier to perform 'what-if' analysis/error ratio calculation of the given DT.

FIG. 13C shows a JSON Tree structure according to an embodiment. FIG. 13D shows implementation in Java script according to an embodiment.

FIG. 13E shows more examples of DT model strings. Both pre processing information and Model string are shown.

FIG. 13F shows Pre Processing information. FIG. 13G shows Representation of above models in the pictorial tree format.

FIG. 13H shows another example for building/arriving at the tree from the C4.5 output data, with pre processing information. FIG. 13I shows a tree. FIG. 13J shows a tree representation.

(8) Ranking the Generated Patterns. Another issue that can arise in automatic pattern recognition and inference according to embodiments, is ranking generated patterns. Specifically, it is possible to obtain thousands of patterns from the DIE. So, absent ranking of generated patterns, it may not be feasible for a user to use the DIE.

Accordingly, embodiments may implement ranking to differentiate across several thousand patterns that may be generated. For example a dataset which has 26 columns can yield up to 65000 patterns. A user manually identifying the top n patterns from such a large number of patterns is not feasible. Thus embodiments have implemented ranking for usability, and the user can rely on this solution for decision-making.

According to a particular embodiment, the following factors were used for ranking:

A) error ratio;
B) depth;
C) occurrences;
D) number of attributes taking part; and
E) usage of boosting factor.

The error ratio factor may be understood as follows. DT will try to understand the pattern in the given dataset. For the example of dataset of Iceland resorts (FIG. 23), in the month of June there is only resort in France booked. So, from Decision tree/pattern perspective this is a pattern. That is, in the month of June, the resort 'A' is booked.

Error ratio finds out the ratio of all the resorts booked in June, versus how many times the Resort A is booked. It helps provide the knowledge of how many times prediction is correct with respect to class variable.

Figures 14A, 14B:
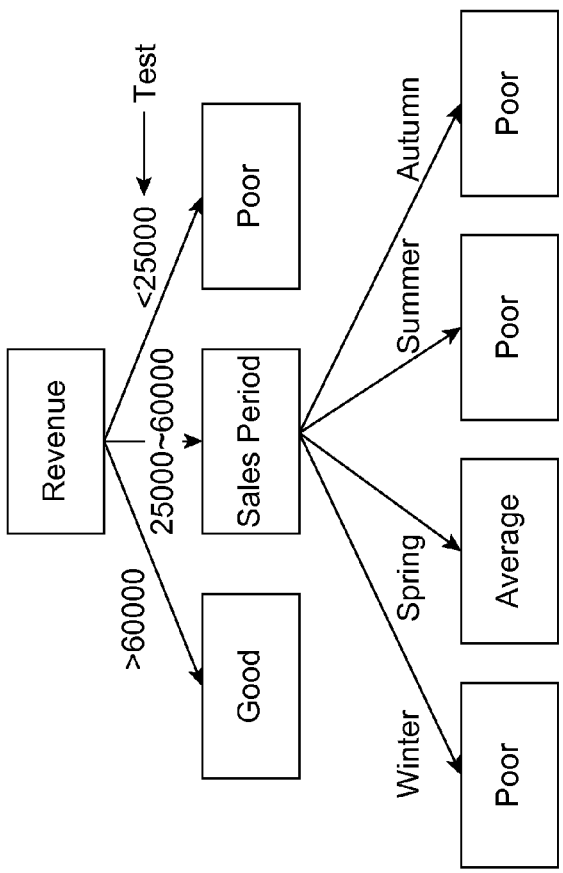
FIG. 14A shows a decision tree.
FIG. 14B Pseudo code for the calculating the error ratio.

A deeper understanding of ranking may be obtained with reference to the tree of FIG. 14A. Here, Revenue greater than 60,000 is a condition, and prediction is class variable is GOOD.

But this is a prediction from our C4.5 created function, and may not be accurate. That is, there could be records having class variable not 'GOOD' even though they have a revenue greater than 65000. This error is called error ratio.

FIG. 14B shows pseudo code for the calculating the error ratio according to an embodiment. This will give overall error ratio. Also, along with the overall error ratio, we shall find out the weight of a given tree/path by using adjacency table representation.

As mentioned above, the output of the C4.5 will be returned in the form of DT. A consideration in the DT is the depth of the tree. Tree depth refers to number of levels in the DT. If DT depth is more, there are more decision points in the given pattern.

For example, consider again the example of the combination of: Country, SalesRevenue, and Product.

| Product | Sales Revenue | City |
|---------|---------------|------|
| A | 50,000 | Bangalore |
| B | 60,000 | Shanghai |
| C | 70,000 | San Francisco |
| D | 51,000 | Bangalore |

Here, there could be several patterns based on the given dataset. For example pattern 1 says that:

if salesRevenue is more than 60000 and product is A, then it is always sold in the country; but if the product is B, then it is always sold in the county UK.

This can be represented in a decision tree as follows:

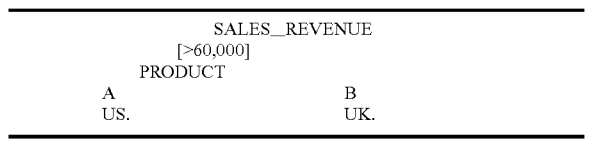

The depth of this tree is 3, as two attributes are needed to determine the decision to be taken. Specifically, SALES_REVENUE and Product determine the country.

Consider another example/pattern that indicates if the sales revenue is less than 60000, then it is always sold in the country of India. This can be represented in the tree format below:

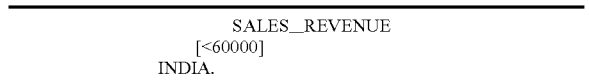

Here, when sales revenue is more than 60,000 then irrespective of product, it is always sold in the specified country. Sales revenue makes the decision. Hence the depth of the tree is 2 in this case.

FIG. 15 shows pseudo code to calculate tree depth according to an embodiment.

Whenever depth is greater, there are more parameters to deal with to arrive to a conclusion from a given set of combinations. When more and more attributes are involved, other attributes need to be altered/modified to make a bigger and wider business impact.

A user seeks to arrive at the same conclusion with the possible minimal impact on his or her business. Thus a tree having lesser depth (i.e. fewer attributes to deal with to arrive at a conclusion)] should be given more preference—it should be ranked higher.

Embodiments identify several patterns for different sets of combinations in the given dataset. Consider, however, a scenario where the given pattern is repeated across the different combination.

That result provides an indication that those columns are strongly connected. So if it occurs more and more, it has stronger bonding, and stronger bonding may override the looser bonding attributes.

Returning again to the previous example, embodiments may generate the combinations:

SALES_REVENUE, PRODUCT and COUNTRY, and
SALES_REVENUE, PROFIT, PRODUCT, COUNTRY, together with all other combinations.

Here, assume the pattern 1 will give the pattern:

if SALES_REVENUE is greater than 60,000 it is always sold in the country INDIA whatever may be the product.

The pattern 2 again gives similar insight:

if SALES_REVENUE is greater than 60,000 than it is always sold in the country INDIA.

Here, the same pattern has occurred twice, and thus the attributes and the link between those attributes are of higher bonding. In both in the pattern 1 and the pattern 2 the connected attributes are SALES_REVENUE and COUNTRY. All other attributes which are part of the combination are not part of the decision making. This proves that those two attributes have stronger relationship under the conditions.

Thus the concept of occurrences may convey that if the same patterns are repeatedly happening, they should take more precedence and be of higher importance than other patterns. Hence we consider more frequency occurring pattern as having higher ranking.

Here, we should be comparing with the parsed JSONs for two patterns. We can't compare the pre processing information and Tree structure because if we just compare only tree structure it gives the wrong result.

For example, consider a tree structure comprises for combination of A, B and C where A, B and C have either YES or NO as their values. Here, assume if A and B are statistically significant, and have condition that:

whenever 'A' is yes then predicted value of B is YES; and if A is NO then predicted value of B is NO.

Now, we obtain another tree structure for the combination X, Y and Z where X, Y and Z have either YES/NO as their value. Here also assume if only X and Y are statistically significant and have the structure:

if X is YES, then predicted value of Y is YES; and if X is NO then the predicted value of Y is NO.

Now in both cases, the tree structure will be same as it is only pointing back to pre processing information. The tree structure will just be having indexing back to information from pre processing information. Because of this, we can't just compare the tree structure.

But, if we start comparing pre processing information and the tree structure, then two patterns can never be equal because pre processing information will have the information about input and not the output. For example if we pass A,B,C and D combinations, and it is only A,B and C that are statistically significant and make the tree structure. In another instance we pass just A, B and C where all of them are statistically significant and get the tree structure A, B and C. Here we expect the pattern A, B and C has occurred twice.

But if we compare pre processing information it will not be equal. This is because in first case pre processing information will have the information on A, B, C and D, and in the second case it will have just A, B and C.

Accordingly, embodiments parse and construct the tree structure from pre processing information and tree model, and comparing those parsed/constructed JSONs. FIG. 16 shows pseudo code for this solution according to an embodiment.

Embodiments may consider a number of attributes as a factor in ranking combinations. Consider a dataset comprising: Sales Revenue, Profit, City and Product. In that case there are two models having the tree structure shown in FIGS. 17A (Tree Structure 1) and 17B (Tree Structure 2).

Tree structure 1 says that if product A is sold and the sales revenue is less than 60,000, then it is always sold in Bangalore. Another condition will be if product B is sold and if the profit is less than 50,000, then it is always sold in KOLKOTTA (for simplicity we have ignored all other conditions/decision paths).

The tree structure 2 says that if product A is sold and SALES_REVENUE is less than 60,000, then the product gets sold in Bangalore. If the product is B and SALES_REVENUE is greater than 60,000, then product always gets sold in KOLKOTTA.

In tree structure 1 total number of attributes in DT is 3, whereas in tree structure 2 the attributes in DT is 2. Embodiments decide to rank the pattern having a fewer number than the one having the greater number. This is because making a decision with a fewer number of attributes may be simpler for the user.

Embodiments may consider both depth and number of attributes. In the example above, both the patterns have same depth. But, the different number of attributes allows for a relative ranking.

Given the plurality of factors (e.g. error ratio, depth, number of attributes and occurrences), the issue that arises is which should be given the most weight in calculating the rank. Certain embodiments may address this utilizing a boosting factor. FIG. 18A shows Pseudo code for overall rank calculation.

Specifically, several testing rounds have have heuristically determined the following order of deciding the rank for the DIE pattern: error ratio; number of occurrence. Depth and number of attributes should be the order of finding out the rank for DIE pattern in the order.

Error ratio is considered as the highest parameter, because user should be looking for validity of the pattern. Error ratio determines how many records will not fall into the prediction done by C4.5. It is an important factor because it questions validity of a particular decision.

If the error ratio is high, then even though a user follows the path of the decision, it has less chance of resulting in the prediction. For example, where there is a condition:
if sales revenue is greater than 65,000 the product sold is A; but if the error ratio is high for this path, then even if the user
   modifies sales revenue to be more than 65,000 it is not guaranteed that product sold is A.

For a user, the very reason of making sales revenue greater than 65,000 would be selling product A. Hence, the error ratio has the highest boosting factor. Also if the error ratio is higher than rank number is also higher.

A second priority may be given to number of occurrence. If the occurrence is greater, a stronger bonding/relationship is indicated.

A user wants to succeed in his decision. If he or she wants to modify some parameter, it is desired to know how strongly it is connected with other attributes and the pattern as a whole. So, occurrence has been given for second priority for the overall ranking calculation.

With more number of occurrences the rank number should be lesser. This is because if occurrences are more, it should be weighed more than other patterns. It is achieved by multiplying negative number.

The other calculating factors are depth and attribute count. These are influential factors for a user decision. So, those are given equal weight in calculating the rank number.

In an example, we can take two patterns: A and B.
Pattern A has the error ratio 0.1, occurred twice, has 3 attributes, and depth of 2.
Pattern B has the error ratio 0.2 occurred thrice, has 4 attributes, and depth of 3.
Here, Pattern A has higher weight because it has a smaller error ratio.

Within the patterns of same error ratio, the pattern which has more occurrences will be weighed more. Among the patterns which has same error ratio and occurrences depth will decide the weight. The last factor decides the weight of a given pattern is depth of the tree.

FIG. 18B shows Pseudo code of Rank Table. FIG. 18C shows an Example for snapshot of content.

According to certain embodiments, a DB Schema for ranking table may have the following fields:
- An ID (auto increment number) serves as a unique identifier to map the details between ranking and all other information generated/derived from a tree.
- PRE_JSONSTR (JSON Pre processing information) stores the pre processing information of the given tree model. The pre processing information is generated by PAL C4.5 algorithm.
- JSONSTR (actual DT JSON needs to be combined with previous column) serves to store the actual JSON tree model. This tree model will be generated by PAL C4.5 algorithm.
- ATTRIBUTES (column names participating in the DT) stores the number of attributes from Decision tree. The attributes column will store the attributes which are taking part in the Decision tree. All the attributes which are stored here in the attributes field are statistically significant.
- NO_OF_ATTRI (number of attributes participating in the DT) represents the total number of attributes taking part in the decision tree generated.
- RANK (rank of the pattern) represents a number generated by the above formula. Higher the rank number lesser the weight of the pattern.
- DEPTH (depth of the tree) stores the depth of the generated pattern/tree. It is a number field.
- CLASS_VARIABLE (class variable in the DT) stores the class variables on which the whole pattern is predicting. It is string field.

(11) Automatic Inference. Embodiments use statistically significant combinations for generating meaningful insights into the stored data. However, the user may not have considered a full extent of potentially significant attributes.

For example, a user might be thinking that sales revenue and month are correlated, but upon analyzing the patterns might not be able to realize insights from that combination. This might be because these two attributes may never be statistically significant.

However, there could be other statistically significant combinations (e.g. sales revenue and age), leading to a helpful insight that people under the age group 18 are making the sales revenue high. But, a problem is how to obtain these insights from statistically significant attribute combinations of which the user is unaware.

Accordingly, embodiments use the DT to provide the meaningful insights because only statistically valid combinations can make/provide the meaningful insights. This is accomplished as follows.

Embodiments run through several combinations (e.g. where one of them is age and sales revenue). Embodiments identify that that particular pattern has more weight.

Also, embodiments may use the interesting condition as a basis for obtaining meaningful insight—based on the error ratio as well. Thus getting an insight that revenue from a particular resort is very high compared to all other resorts, is insightful information. Getting an insight re: revenue during particular season is much lower, is another example to be obtained from DIE.

Accordingly, embodiments use the DT to provide the most meaningful and informative Mid you know') kind of information from the DT. A detailed discussion of insight generation is found in the U.S. Nonprovisional patent application Ser. No. 13/692,680 filed on the same date herewith, and incorporated by reference in its entirety herein for all purposes.

FIG. 19 shows Pseudo code for a schema that will have the DIE ranking and mapping with statistically valid combinations in the DIE Pattern. This would be consumed for generating meaningful insights.

For example, consider that DIE has identified statistical significance between store sales and customer_city. Then, we can find out other interesting information from these statistically significant combinations, e.g.:

Store_Sales is HIGH when Customer_city is Olympia;
Store_Sales is HIGH when Customer_city is Puyallup;
Store_Sales is LOW when the_day is Wednesday.

Another issue can arise in ranking of the attributes for given data. For example there could be scenario that a user wants to know the weight/rank of attributes of the given dataset. The user may not want to go into a detailed pattern, the use case is to know in the given dataset what the most influential attribute is (e.g. in the given use cases each dataset has around 20-30 attributes).

A user may need to find out what are the most influential attributes, in order. For example, an Iceland resort administrator may need to deal with several attributes to maintain the resort, including country of the resort, sales person for the particular resort, location of the particular resorts, etc. In taking the decisions, the user/resort administrator often needs to know the priority of these attributes is.

Accordingly, embodiments may determine the ranking/weight of the given column in overall patterns generated. A factor taken into consideration is a number of times that a particular column has occurred in the set of patterns (the more patterns in which it appears, the greater its influence).

Along with number of occurrences of the particular attribute, also considered are the ranking of the patterns which it is part of. So, a user can get the first hand information on how an attribute contributes to a given dataset. This is illustrated in connection with the following example.

In connection with the Iceland resorts data (FIG. 23), it is desired to determine the rank of the attributes. Now we shall take into consideration patterns found automatically in the given dataset. Upon obtaining these patterns, we will verify how many patterns have contribution from a particular attribute. Along with that information, we shall also consider the rank of the pattern influenced by the attribute. Based upon both types of information, we shall come up with attribute ranking.

In an embodiment, the formula for calculating the attribute ranking is:

$$attrRank = n1c1 + (-1)n2c2,$$

where:
n1 is the total number of patterns to which the attribute participates;
C1 is the boosting factor;
N2 is the sum of the rank number; and
C2 is the boosting factor for the rank number.

As the rank number becomes more weight will be less. Hence, while calculating the attribute number, we shall subtract the rank number so that more weight will be given to high the attribute ranking.

The boosting factor for the number of patterns taken part in, is more than the rank number. This is because if it occurs in multiple patterns, it means it has stronger influence in decision factors in the given dataset.

Embodiments display automatically generated analysis information to the user. A user will not know all statistically significant columns in the given dataset, and how to assess them. This gives rise to the issue of visualizing statistically significant information of a given dataset in useful ways.

According to particular embodiments, the analyzed information may be displayed in the form of an 'infoBlock'. The analysis is performed on the given dataset, and statistically significant attributes determined.

From patterns determined relevant in the given dataset, filtered are patterns lacking at least one measure/numeric (necessary in displaying this information as a chart). From those patterns having at least one measure, we shall construct the term called 'infoBlock'. Those infoBlocks shall be displayed as the visualization for the above said patterns.

Figure 20B:
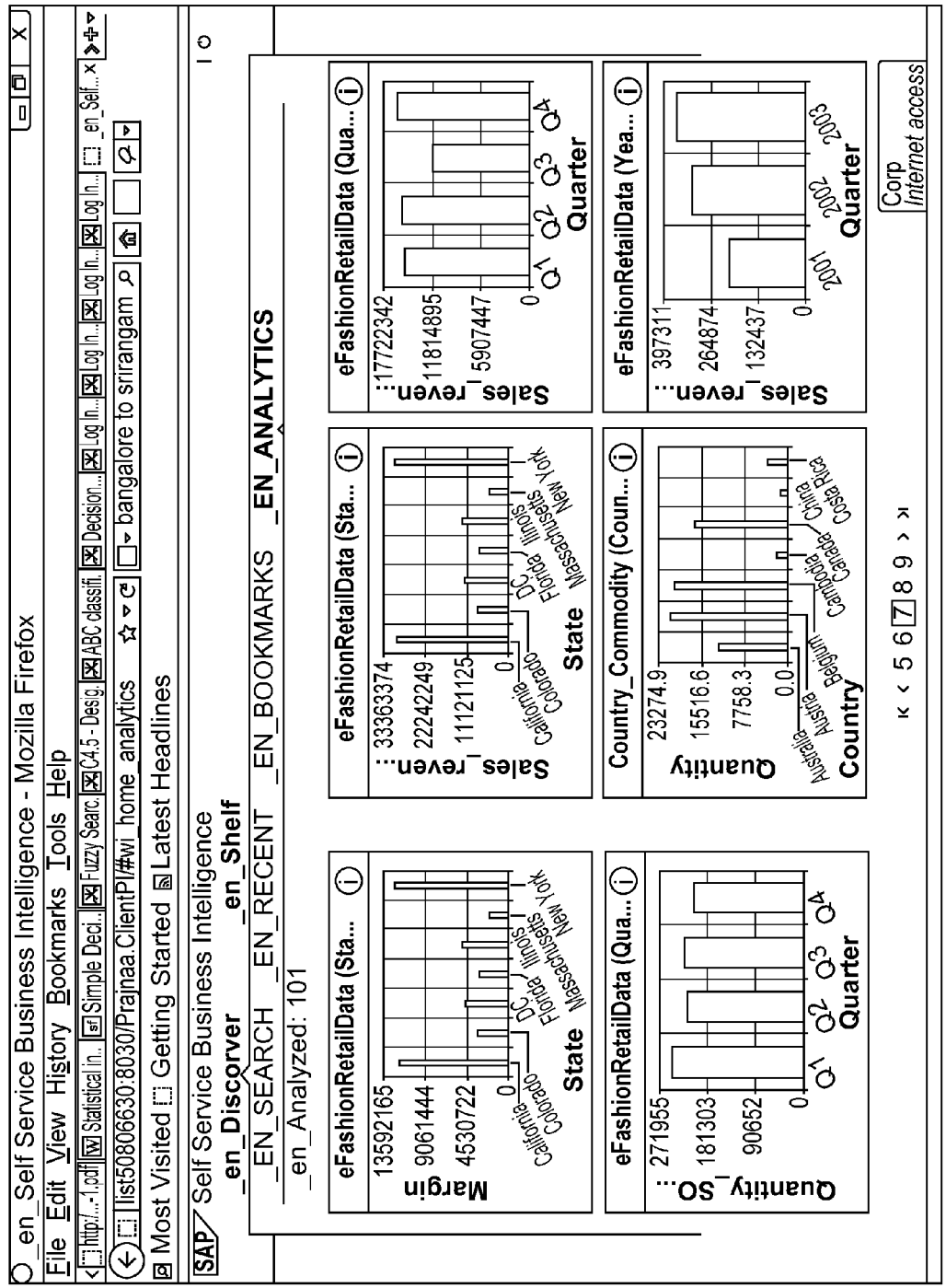
FIGS. 20B-C are details for a particular infoBlock.
Figure 20C:
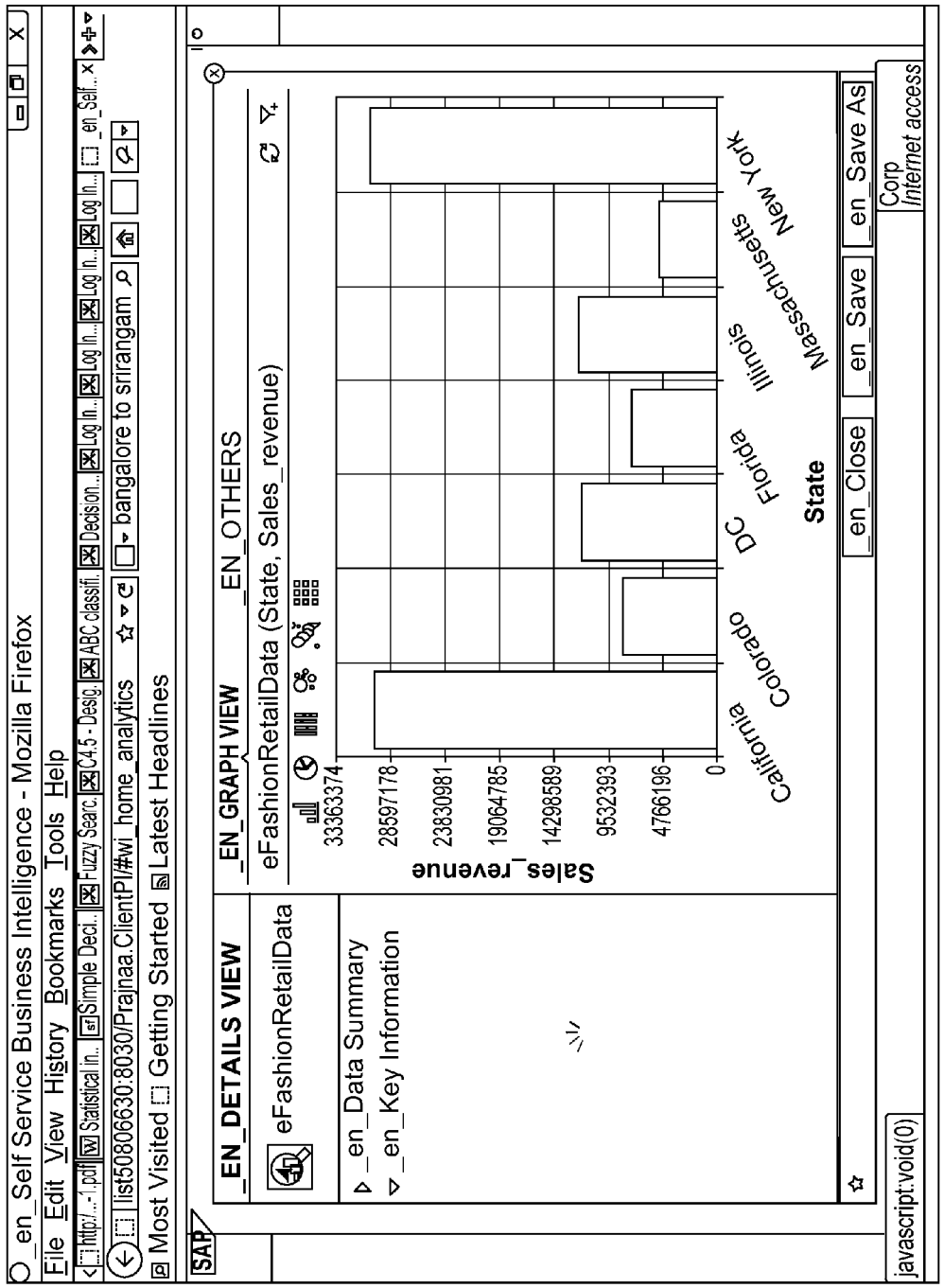

FIG. 20A shows the java script implementation to generate tuple from given set of columns present in the DIE pattern. FIG. 20B is a screenshot showing details for a particular infoBlock. FIG. 20C is a screenshot showing another infoBlock.

In this example, we have identified that in the user efashion retail data, the information of state and margin is important and significant. Also important and significant are sales_revenue and state—so on and so forth.

This aids the user because he or she does not need to know what the significant details are in the given dataset. So without a user knowing anything about those particular patterns and combinations, embodiments have produced for display statistically significant columns, the relationship between those attributes, and a visualization of relationships between those attributes.

(12) 'What if' Analysis. Embodiments may allow a "what if" analysis to be performed for a given infoBlock. Specifically, upon identifying a set of statistically significant columns, then a next set of operation/problem is to analyze those attributes. In particular, a user may desire to know the answers to one or more of the following questions.

How are the attributes are connected?
On what basis are those attributes connected?
How does changing one attribute value change the other value of the attribute?

Figure 21B:
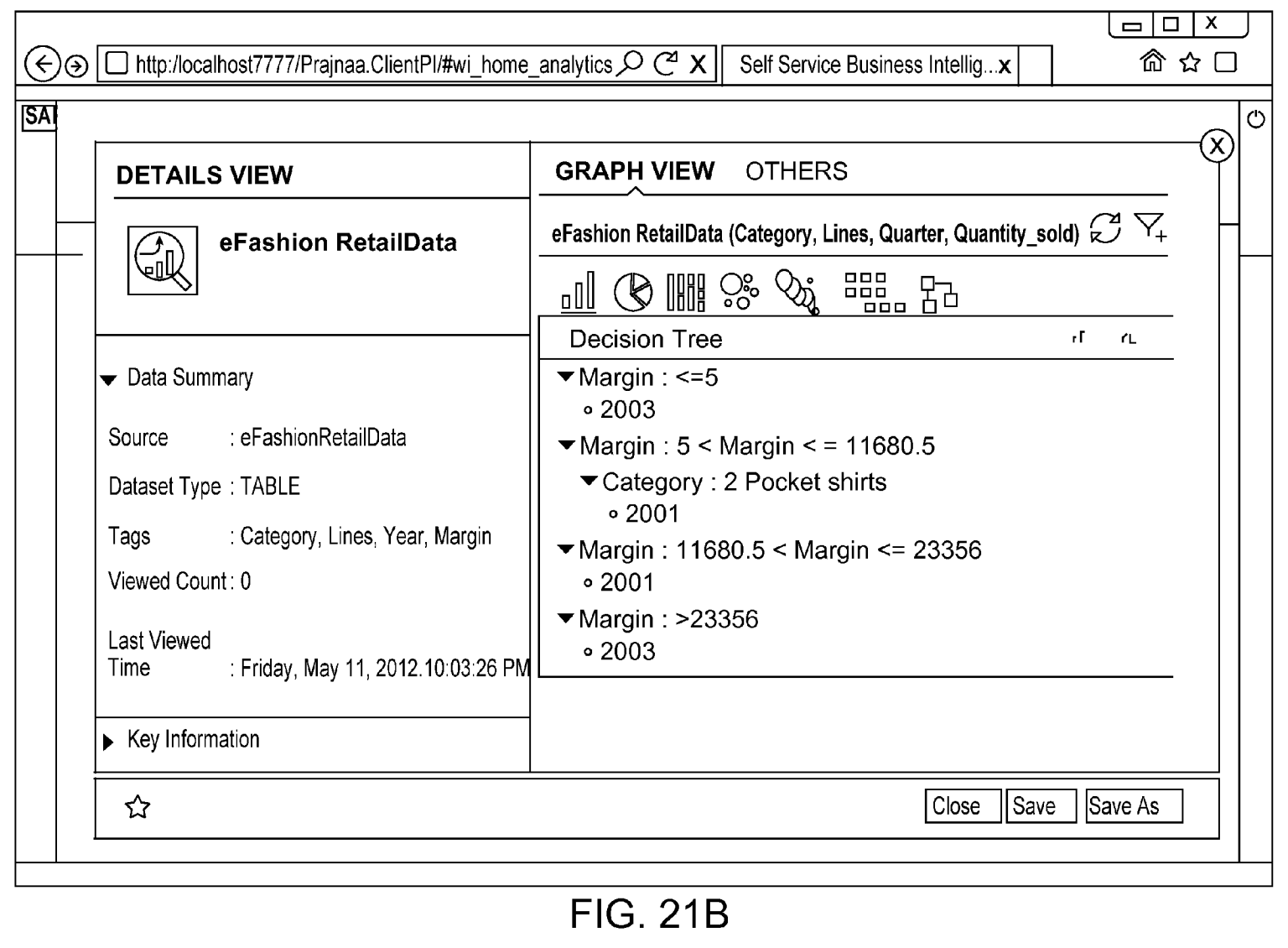

For example from the infoBlock data (e.g. as shown in FIGS. 21A-21C), a user may seek to know if the Quantity is sold is between 500-700 then what is the prediction of the quarter that gets sold—a "what if" question. Embodiments may provide such a "what if" analysis as follows.

Embodiments allow a user to perform a "what if" analysis on an infoBlock comprising statistically connected columns A values combo box receives the dimensions which have definite values.

In the following example, assume that an embodiment has identified a decision tree having the following two paths:
if quantity sold are between 500 and 700 and category is 2 pocket shirts, then it is sold in Q3;
if quantity sold are greater than 700 and category is 4 pocket shirts, then it is sold in Q2.

Here, Quantity is the continuous variable; we shall not have the definite values for them. We determine the value meter for the measure values. Both these measure and dimension values are modified by the user.

On changing the slider for the measure, embodiments may automatically identify a new path. For the above problem if the quantity is 500 to 700, then the path taken in the decision tree is 2 pocket shirts category and sold in quarter Q3 would be highlighted.

Assume the user wants to know, "what if the quantity sold is above 700". Then, embodiments identify another path that category sold would be 4 pocket shirt and sold in Q2.

About combo box for the value of dimension [/String] category will be having values 2 pocket shirts and 4 pocket shirts. If user is interested to know: "what if the category is 2 pocket shirts", embodiments can identify that it will be sold in Q3. And if the user is interested in the category 4 pocket shirts, embodiments say it will be sold in the Quarter Q2.

(13) Reverse Inference. Pattern identification and inferencing according to embodiments may also provide a reverse inference. Addressed above is the issue of having a variable like category 4 pocket shirts, and finding out when it is sold (i.e in which quarter it is sold).

But, it often happens that a user knows the class variable. That is, he or she knows the current quarter Q1, and for the coming Q2 desires to know which category should be produced and what should be the quantity of the category should be produced.

In another example, for the Iceland resorts data suppose the Iceland Resorts administrator has been given the constraint that he can open a resort in a particular country. How should he or she deal with attributes such as sales person, and what can be the revenue expected etc?

The two examples described above are real world reverse inference problems. In these problems the user has the end result in hand (or is bound by some end result constraint), and seeks to analyze the impact of this information on another set of parameters.

Another example is of having intended results, and wanting to moderate the other parameters influencing that result variable. Thus if a user comes to know that Sales Revenue, Product, and Country are statistically significant according to the analysis performed by an embodiment.

Now, the user wants to know sell in the COUNTRY India. Having targeted the country as India, what product and sales revenue can best fit there?

Embodiments address the reverse inference issue utilizing the decision tree. In particular, a decision tree represents each pattern. The user is allowed to select an attribute of interest.

Upon this selection, we shall filter the paths which has that value. Those are different paths that can/will lead to his intended decision.

On available paths, a user can express his interest on some particular path based upon feasibility. The path of his interest can then be detailed.

Referring again to the Iceland Resorts Data, the decision tree for the resort administrator expresses his interest that if he is to open the next resort only in India, then what would be the sales person he should rely on. Embodiments may identify that either sales person A or Sales Person B can do equally better for the country India, as they have expertise of marketing the resorts well in India. Now the Iceland Resorts administrator knows that now Sales person B is in another assignment so sales person can be posted to new resort in India.

Here is one another example. The decision tree of FIG. 22A is for the variable Play, Outlook, Temperature and Windy. These terms have general meanings. Given Play, Outlook, and Temperature, the user wants to understand the predicted value of Windy.

One condition here is if Play YES, outlook is sunny, then windy is true (left most path in FIG. 22A). The other path/condition is if Play is NO and outlook is rainy, then the predicted value of Windy is true.

Here knowing the value of Play and Outlook, and predicting the value of Windy, comprises "what if" analysis. By contrast, predicting the values of attributes like Play/Outlook and Temperature where the value of Windy is known, is a Reverse Inference.

Here, if we know Windy is 'TRUE', what are the associated attributes values?

As shown in Figure U2, an embodiment may identify that there are actually four (4) paths leading to the value for Windy being TRUE. On seeing those values, a user may decide that the value of Play is YES, Outlook is overcast, and Temperature is less than 75, makes more sense to particular fact situation. Again, this is called Reverse Inference.

In conclusion, embodiments may generate ranked patterns on a data set in an efficient manner. The combination generation technique offers a powerful way of visualizing patterns, and can be implemented in Java Script.

Embodiments also address the problem of strong type definition of L Script for using PAL. L Scripts are used so that even thousands of combinations/procedure calls can be catered by just a limited number of procedures created at compile time.

Particular embodiments may run/support heavy-weight applications like DIE in an application server, which does not have background jobs. It is often needed to run the heavy weight application on the application server which does not have background threads.

Embodiments can also perform random sampling a part of the process. While SQL does not support the random function, this is implemented utilizing L script.

Embodiments also allow discretization of continuous variables for PAL. Though discretization is used in a different context, this is done with PAL input using equal frequency based discretization.

Embodiments can also parse the output of PAL C4.5. C4.5 will return the data in more cluttered format. The parsed output can be in the form of a row in the adjacency table representation of tree structure. This facilitates the user obtaining the error ratio, tree representation.

Embodiments may be performance oriented. This application may create READ ONLY SQL procedure which enables the parallelization.

Embodiments may rank the generated Patterns. This application may get thousands of patterns. Ranking is useful in filtering out the patterns. We have found out methods to find out and ease user to get the most important patterns by using several key parameters in deciding the ranking.

Embodiments may perform the ranking of the attributes in the given dataset. (it may assign the weight to individual columns/attributes of the given dataset).

Embodiments may generate analysis information and visualizes in a best and in a user friendly manner. Embodiments may provide the statistically valid combination. This can be used for generating meaningful insights across different application. Embodiments may allow the user to perform "what if" analysis.

Embodiments may support the reverse inference on the identified patterns. Embodiments may generate patterns at the Run-time. Embodiments may be plugged into other applications. The Ranking Technique used in the solution may make sure that the patterns are prioritized and the high priority patterns are most significant.

In summary, embodiments can provide an efficient, easily pluggable, low maintenance and scalable solution which can be used to arrive to best decision from a raw Data Set/Analytical View at Run-time and thus increases efficiency of the business.

Thus returning to the case of the high level executive, embodiments may identify the number of different combinations including brand and location factors as well. We will come with the pattern and come up with the insight for what could be the best location for an existing brand—it solves the problem like identifying right location for a given brand.

The problem can be solved by seeing the pattern generated by this innovation by taking the factors customers, income level, brand and city. The executive as advised can do what if analysis on the income level and customer factors and he can identify the result. By this executive can see what should be target income level customer for a product that would be sold at particular location.

Embodiments begins by identifying the factors associated each other by generating several combinations and finding out the statistical significance of those factors represented as attributes in the given dataset. Embodiments address the problem of knowing associating factors in the given dataset.

Embodiments generate the different possible decisions that can be made on the dataset and also by ranking we shall provide the information on what would be the best decision that can be made which solves the problem of getting the best possible decision.

By doing ranking of attributes/factors we will let the executive know what is the factor has the most influential overall in the given data. The most ranked factor is an influential factor in the given dataset.

By supporting the concept of reverse inference, embodiments may solve the problem how can an executive can work with other attributes having target in hand.

As the analysis happens at run time and also from the performance aspects, embodiments can leverage the performance capabilities of HANA. Also the whole solution/innovation has been built with possible best performance measures.

So with one or more of these features, it is much easier for the person who wants to do the analysis of an impact of moderating of particular combination would be much simpler and straight forward. He uses this innovation to generate different ranked patterns. The product will give him the best ranked pattern and by seeing the best ranked pattern the user will take the most efficient decision. His decision can be validated and supported by what if analysis and reverse inference. We shall also support the meaningful insights.

Figure 25:
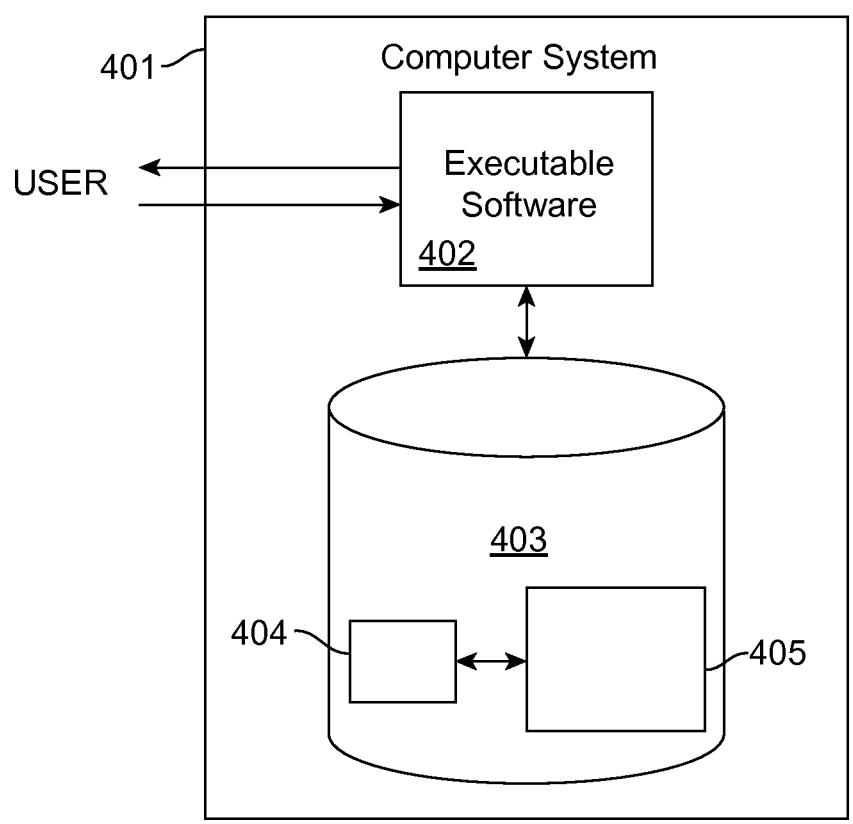
FIG. 25 illustrates hardware of a special purpose computing machine configured to perform automatic pattern recognition according to an embodiment.

FIG. 25 illustrates hardware of a special purpose computing machine configured to perform pattern recognition according to an embodiment. In particular, computer system 2500 comprises a processor 2502 that is in electronic communication with a non-transitory computer-readable storage medium 2503. This computer-readable storage medium has stored thereon code 2505 corresponding to a data inference engine. Code 2504 corresponds to an in memory database. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 26:
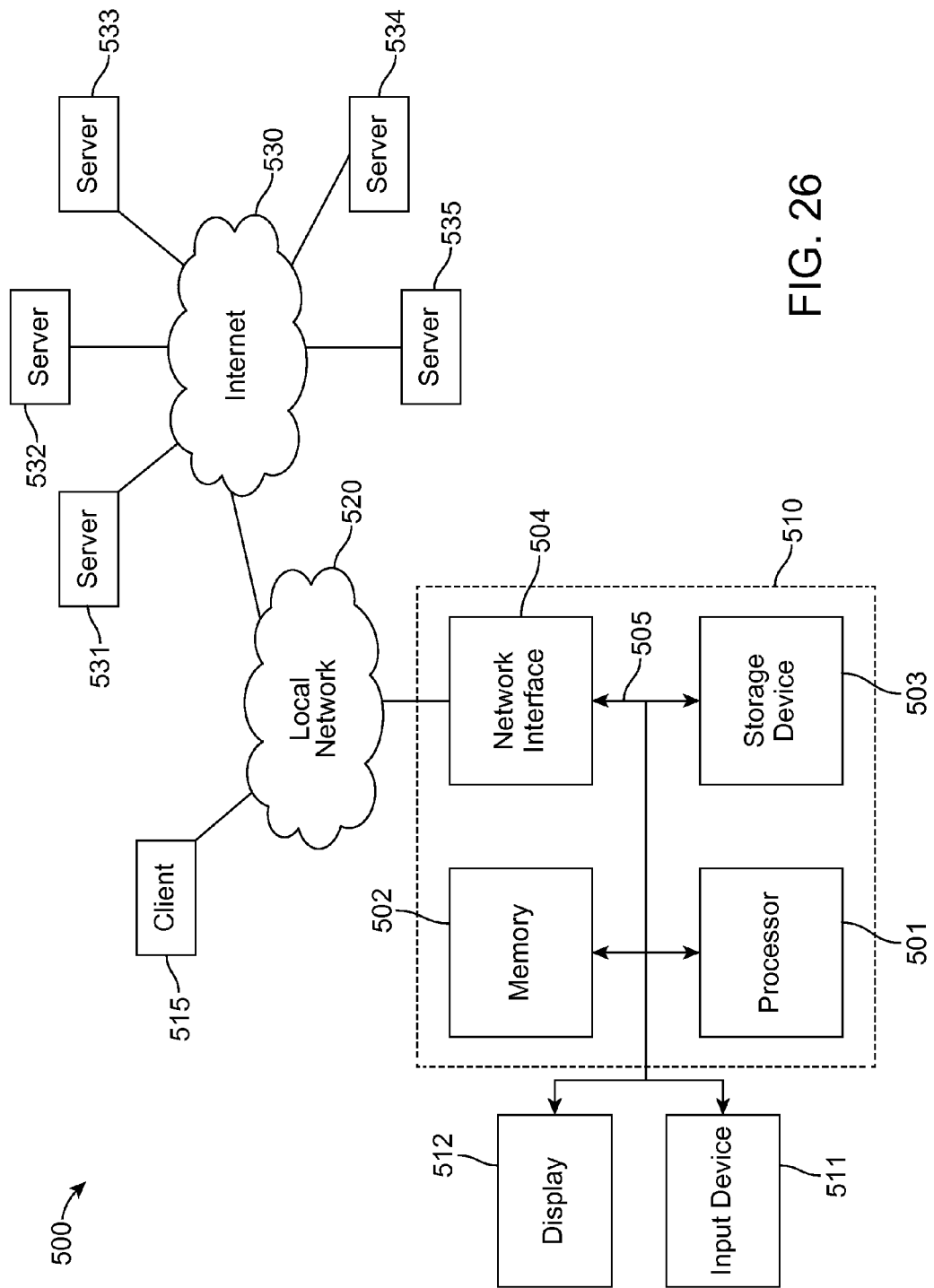
FIG. 26 illustrates an example of a computer system.

An example computer system 2610 is illustrated in FIG. 26. Computer system 2610 includes a bus 2605 or other communication mechanism for communicating information, and a processor 2601 coupled with bus 2605 for processing information. Computer system 2610 also includes a memory 2602 coupled to bus 2605 for storing information and instructions to be executed by processor 2601, including information and instructions for performing the techniques described above, for example. This memory may also be used for storing variables or other intermediate information during execution of instructions to be executed by processor 2601. Possible implementations of this memory may be, but are not limited to, random access memory (RAM), read only memory (ROM), or both. A storage device 2603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2603 may include source code, binary code, or software files for performing the techniques above, for example. Storage device and memory are both examples of computer readable mediums.

Computer system 2610 may be coupled via bus 2605 to a display 2612, such as a cathode ray tube (CRT) or liquid crystal display (LCD), for displaying information to a computer user. An input device 2611 such as a keyboard and/or mouse is coupled to bus 2605 for communicating information and command selections from the user to processor 2601. The combination of these components allows the user to communicate with the system. In some systems, bus 2605 may be divided into multiple specialized buses.

Computer system 2610 also includes a network interface 2604 coupled with bus 2605. Network interface 2604 may provide two-way data communication between computer system 2610 and the local network 2620. The network interface 2604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 2604 sends and receives electrical, electromagnetic, or optical signals that carry digital data streams representing various types of information.

Computer system 2610 can send and receive information, including messages or other interface actions, through the network interface 2604 across a local network 2620, an Intranet, or the Internet 2630. For a local network, computer system 2610 may communicate with a plurality of other computer machines, such as server 2615. Accordingly, computer system 2610 and server computer systems represented by server 2615 may form a cloud computing network, which may be programmed with processes described herein. In the Internet example, software components or services may reside on multiple different computer systems 2610 or servers 2631-2635 across the network. The processes described above may be implemented on one or more servers, for example. A server 2631 may transmit actions or messages from one component, through Internet 2630, local network 2620, and network interface 2604 to a component on computer system 2610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    providing a data set comprising data organized in rows and columns;

generating a decision tree comprising a combination of between 2-4 columns;
evaluating a statistical significance of the combination of columns;
ranking the combination of columns; and
based upon the ranked combination of columns, performing additional analysis selected from:
ranking of columns;
performing a "What if" analysis; and
obtaining a reverse inference.

2. A method as in claim 1 further comprising:
generating an inference based upon a ranked combination of columns comprising at least one numerical measure; and
displaying the inference as a chart comprising the numerical measure.

3. A method as in claim 1 wherein ranking the combination of columns considers a factor selected from: a decision tree depth, an error ratio, a number of occurrences, a number of attributes, and a boosting factor.

4. A method as in claim 1 wherein the combinations of columns include a continuous variable, and the method further comprises discretizing the continuous variable.

5. A method as in claim 1 further comprising creating a READ ONLY procedure in order to generate the decision tree.

6. A non-transitory computer readable storage medium embodying a computer program for performing a method on a processor, said method comprising:
providing a data set comprising data organized in rows and columns;
generating a decision tree comprising a combination of between 2-4 columns;
evaluating a statistical significance of the combination of columns;
ranking the combination of columns; and
based upon the ranked combination of columns, performing additional analysis selected from:
ranking of columns;
performing a "What if" analysis; and
obtaining a reverse inference.

7. A non-transitory computer readable storage medium as in claim 6 wherein the method further comprises:
generating an inference based upon a ranked combination of columns comprising at least one numerical measure; and
displaying the inference as a chart comprising the numerical measure.

8. A non-transitory computer readable storage medium as in claim 6 wherein ranking the combination of columns considers a factor selected from: a decision tree depth, an error ratio, a number of occurrences, a number of attributes, and a boosting factor.

9. A non-transitory computer readable storage medium as in claim 6 wherein the combinations of columns include a continuous variable, and the method further comprises discretizing the continuous variable.

10. A non-transitory computer readable storage medium as in claim 6 wherein the method further comprises creating a READ ONLY procedure in order to generate the decision tree.

11. A computer system comprising:
one or more processors;
a software program, executable on said computer system, the software program:
providing a data set comprising data organized in rows and columns;
generating a decision tree comprising a combination of between 2-4 columns;
evaluating a statistical significance of the combination of columns;
ranking the combination of columns; and
based upon the ranked combination of columns, performing additional analysis selected from:
ranking of columns;
performing a "What if" analysis; and
obtaining a reverse inference.

12. A computer system as in claim 11 wherein the software program:
generates an inference based upon a ranked combination of columns comprising at least one numerical measure; and
displays the inference as a chart comprising the numerical measure.

13. A computer system as in claim 11 wherein ranking the combination of columns considers a factor selected from: a decision tree depth, an error ratio, a number of occurrences, a number of attributes, and a boosting factor.

14. A computer system as in claim 11 wherein the combinations of columns include a continuous variable, and the method further comprises discretizing the continuous variable.

15. A computer system as in claim 11 further comprises creating a READ ONLY procedure in order to generate the decision tree.

* * * * *